(12) United States Patent
Banerjee et al.

(10) Patent No.: US 12,524,666 B2
(45) Date of Patent: Jan. 13, 2026

(54) SOLID-STATE DETECTOR CHARACTERIZATION BY MACHINE LEARNING-BASED PHYSICAL MODEL WITH REDUCED DEFECT LEVELS

(71) Applicants: Siemens Medical Solutions USA, Inc., Malvern, PA (US); Northwestern University, Evanston, IL (US)

(72) Inventors: Srutarshi Banerjee, Chicago, IL (US); Miesher Rodrigues, Buffalo Grove, IL (US); Alexander Hans Vija, Evanston, IL (US); Aggelos Katsaggelos, Chicago, IL (US)

(73) Assignees: Siemens Medical Solutions USA, Inc., Malvern, PA (US); Northwestern University, Evanston, IL (US)

( * ) Notice: Subject to any disclaimer, the term of this patent is extended or adjusted under 35 U.S.C. 154(b) by 676 days.

(21) Appl. No.: 17/938,686

(22) Filed: Oct. 7, 2022

(65) Prior Publication Data

US 2024/0119273 A1   Apr. 11, 2024

(51) Int. Cl.
 *G06N 3/08* (2023.01)
(52) U.S. Cl.
 CPC ..................... *G06N 3/08* (2013.01)
(58) Field of Classification Search
 CPC .......................................... G06N 3/08
 USPC .......................................... 706/17
 See application file for complete search history.

(56) References Cited

U.S. PATENT DOCUMENTS

| | | | |
|---|---|---|---|
| 11,480,608 B2 * | 10/2022 | Banerjee | G06N 3/063 |
| 2021/0133564 A1 | 5/2021 | Banerjee et al. | |
| 2021/0166375 A1 * | 6/2021 | Pandev | G06T 11/006 |

OTHER PUBLICATIONS

Kajita et al., "A universal 3D voxel descriptor for solid-sate material informatics with deep convolutional neural networks", Scientific Reports 7: 16991: www.nature.com/scientificreports, Dec. 5, 2017 (Year: 2017).*
Kashinath et al., "Phsics-informed machine learning: case studies for weather and climate modeling", Philosophical transactions A, No. 2020, The Royal society publishing, 2021 (Year: 2021).*
D. P. Kingma and J. Ba, "Adam: A method for stochastic optimization," arXiv preprint arXiv:1412.6980, 2014.

(Continued)

*Primary Examiner* — Tsu-Chang Lee

(57) ABSTRACT

A physics-based network model is trained to learn weights such as trapping, detrapping, and/or transport of holes and/or electrons, as well as voltage distribution on a voxel-by-voxel basis throughout a solid-state detector model. The physics-based network may be used to estimate material property variation throughout the voxels. To reduce the number of experimental setups and information needed to train the models, the models may be trained using more easily acquired ground truth. Just the electrode signals or just the free charge data is used to train the model to characterize the solid-state detector. With this reduced data, the detector may be characterized using equivalency, such as combining multiple trapping centers to an equivalent trapping center. Regularization may be used in the loss calculation, such as where just the electrode signals are used, to deal with the reduced data available as ground truth.

14 Claims, 19 Drawing Sheets

(56) References Cited

OTHER PUBLICATIONS

J. Willard, X. Jia, S. Xu, M. Steinbach, and V. Kumar, "Integrating physics-based modeling with machine learning: A survey," arXiv preprint arXiv:2003.04919, Jul. 2020.

M. Rodrigues, "High-flux experiments and simulations of pulse-mode position-sensitive CdZnTe pixelated detectors," Ph.D. dissertation, University of Michigan, 2012.

M. Rodrigues, "High-flux experiments and simulations of pulse-mode 3D-position-sensitive CdZnTe pixelated detectors." 2011 IEEE Nuclear Science Symposium Conference Record. IEEE, 2011.

Banerjee, S., Rodrigues, M., Vija, A. H. & Katsaggelos, A. K. A learning-based physical model of charge transport in room-temperature semiconductor detectors. IEEE Transactions on Nucl. Sci. 69, 2-16, DOI: 10.1109/TNS.2021.3130486 (2022).

U.S. Appl. No. 17/302,718, filed May 11, 2021.

Karniadakis, G. E. et al. Physics-informed machine learning. Nat. Rev. Phys. 3, 422-440 (2021).

Khoo, Y., Lu, J. & Ying, L. Solving for high-dimensional committor functions using artificial neural networks. Res. Math. Sci. 6, 1 (2019).

Han, J., Jentzen, A. & Weinan, E. Solving high-dimensional partial differential equations using deep learning. Proc. Natl. Acad. Sci. 115, 8505-8510 (2018).

Hughes, T.W., Williamson, I. A., Minkov, M. & Fan, S. Wave physics as an analog recurrent neural network. Sci. advances 5, eaay6946 (2019).

Lu, L., Jin, P., Pang, G., Zhang, Z. & Karniadakis, G. E. Learning nonlinear operators via deeponet based on the universal approximation theorem of operators. Nat. Mach. Intell. 3, 218-229 (2021).

Markidis, S. The old and the new: Can physics-informed deep-learning replace traditional linear solvers? Front. big Data 92 (2021).

S. Parsons, A. Langley, C. Shenton-Taylor and A. Lohstroh, "Investigating the Components of Signals Produced by the Pockels CCD Imaging Technique in CdZnTe," in IEEE Transactions on Nuclear Science, vol. 65, No. 9, pp. 2633-2639, Sep. 2018.

U. N. Roy, et al. "Charge transport properties of as-grown CZT by traveling heater method." Nuclear Instruments and Methods in Physics Research Section A: Accelerators, Spectrometers, Detectors and Associated Equipment 652.1 (2011): 162-165.

M. Groza, et al., "Investigation of the internal electric field in cadmium zinc telluride detectors using the Pockels effect and the analysis of charge transients", Journal of Applied Physics, 107(2), (2010), p. 023704.

\* cited by examiner

Cathode Side

Anode Side

| Property | Material "1" | Material "2" |
|---|---|---|
| Mobility of free electrons [cm²/V/s] | 1000 | |
| Mobility of free holes [cm²/V/s] | 50 | |
| Diffusion coefficient of free electrons [cm²/s] | 18.975 | |
| Diffusion coefficient of free holes [cm²/s] | 1.265 | |
| Probability of electrons trapping into defect level "1" [%] | 10 | 0 |
| Probability of electrons detrapping from defect level "1" [%] | 20 | 100 |
| Probability of holes trapping into defect level "1" [%] | 10 | 0 |
| Probability of holes detrapping from defect level "1" [%] | 1 | 100 |
| Probability of holes trapping into defect level "2" [%] | 20 | 0 |
| Probability of holes detrapping from defect level "2" [%] | 1 | 100 |

Fig. 1B

SOLID-STATE DETECTOR CHARACTERIZATION BY MACHINE LEARNING-BASED PHYSICAL MODEL WITH REDUCED DEFECT LEVELS

BACKGROUND

In the medical field, detectors on imaging devices such as CT, SPECT and X-ray scanners have been proposed with solid-state materials. To determine if a material is suitable for a particular application, typically an expert must perform a thorough material characterization using specialized equipment and expertise. The characterization of solid-state detectors in literature, so far has been done by numerous experimental measurements and simulations using dedicated equipment. A major limitation of such conventional methods is that materials can only be characterized as a single or a couple of properties in the bulk. It is challenging, if not impossible, to have a detailed description of the material properties on a voxel-by-voxel basis for voxel sizes in micrometer scale. Moreover, the resource and time required to achieve more detailed results using conventional measurements are not justifiable.

Rather than describing the physics in detail, the physical phenomena (charge and voltage distribution based on physics) of the solid-state material may be modeled based on machine learning to more quickly characterize or describe the solid-state detector. U.S. Published Patent Application No. 2021-0133564 teaches a network model for predicting trapping, detrapping, and/or transport of holes and/or electrons as well as voltage distribution on a voxel-by-voxel basis throughout the solid-state detector model. While rapidly providing the physical phenomena, this network model may have spatial limitations in the prediction for weaker signals as compared to stronger signals. U.S. Published Patent Application No. US-2022-0366232-A1 teaches an enhancement based on relative weighting of strong (e.g., electrode signals) and weak (e.g., hole) information in the loss calculation. Training may be difficult due to difficulty in obtaining the various ground truth data.

SUMMARY

Embodiments of the present invention address and overcome one or more of the above shortcomings and drawbacks. Rather than describing the physics in detail, the physical phenomena (charge and voltage distribution based on physics) of the solid-state material may be modeled based on machine learning to more quickly characterize or describe the solid-state detector. Methods, systems, and apparatuses related to a space time network for solid-state material studies. U.S. Published Patent Application No. 2021-0133564 teaches a network model for predicting trapping, detrapping, and/or transport of holes and/or electrons as well as voltage distribution on a voxel-by-voxel basis throughout the solid-state detector model. The network may be used to estimate material property or charge and voltage variation throughout.

Anode and cathode signals as well as the voltage distribution are relatively strong signals compared to the weaker electron and hole signals. Electron signals may be stronger than hole signals. As a result, the relatively weaker signals may be limited in range across voxels from a given injection location. Since holes travel less rapidly than electrons, the spatial limitation is even greater for holes. U.S. Published Patent Application No. US-2022-0366232-A1 teaches an approach to expand the range or magnify the effect. The loss function used in training the model may use a weighted combination where the weaker signals are weighted more heavily than stronger signals without substantially reducing the influence of the stronger signals. This improves the inference, resulting in improvement of accuracy and range of the trained model.

To reduce the number of experimental setups and information needed to train the models, the models may be trained using more easily acquired ground truth. Just the electrode signals or just the free charge data is used to train the model to characterize the solid-state detector. With this reduced data, the detector may be characterized using equivalency, such as combining multiple trapping centers to an equivalent trapping center. Regularization may be used in the loss calculation, such as where just the electrode signals are used, to deal with the reduced data available as ground truth.

In a first aspect, a method of training a network modeling physical phenomena of semiconductor material is provided. The network models the semiconductor material in voxels with electrodes on the semiconductor material. Each voxel is represented in the neural network by a tensor field defined by (i) a location of the voxel within the semiconductor material and (ii) one or more physics-based phenomena. The network is machine trained. A loss is calculated as part of the machine training. The loss is a difference from just electrode signals or just free charges.

In one embodiment, the loss is calculated with just the electrode signals. A loss function for calculating the loss includes a first regularization term. For example, the loss is calculated with just electron signals and hole signals at different electrodes. The loss function includes the first regularization term for the electrode signals and a second regularization term for the hole signals. As a further example, the loss function includes first and second weights for the first and second regularization terms, respectively. The first weight is larger than the second weight by a factor of five or more.

Various regularizations may be used, such as a total variation regularization. In one example loss function with total variation regularization, the loss function is: $Loss_{RM4} = [(sg_{e,gt} - sg_{e,L})^2] + \lambda_1 \|\nabla w_{eTeq} + \nabla w_{eDeq} + \nabla w_{eRec}\|_2 + [(sg_{h,gt} - sg_{h,L})^2] + \lambda_2 \|\nabla w_{hTeq} + \nabla w_{hDeq} + \nabla w_{hRec}\|_2$, where $Loss_{RM4}$ is the loss, $sg_{e,gt}$ is the electrode signal as ground truth, $sg_{e,L}$ is an estimated electrode signal of the network, $w_{eTeq}$ is a learnable weight of the network for electron trapping, $w_{eDeq}$ is a learnable weight of the network for electron detrapping, $w_{eRec}$ is a learnable weight of the network for electron recombination, $sg_{h,gt}$ is the hole signal as ground truth, $sg_{h,L}$ is an estimated hole signal of the network, $w_{hTeq}$ is a learnable weight of the network for hole trapping, $w_{hDeq}$ is a learnable weight of the network for hole detrapping, $w_{hRec}$ is a learnable weight of the network for hold recombination, $\lambda_1$ and $\lambda_2$ are weights in the loss function for the total variation regularization implemented by the terms $\|\nabla w_{eTeq} + \nabla w_{eDeq} + \nabla w_{eRec}\|_2$ and $\|\nabla w_{hTeq} + \nabla w_{hDeq} + \nabla w_{hRec}\|_2$.

In one embodiment, the loss is calculated with the electrode signals or the free charges as the only ground truth in the machine training of the network.

In other embodiments, the one or more physics-based phenomena include an equivalent defect representing multiple trapping centers as a single trapping center. For example, the equivalent defect is a first learnable weight of the network for equivalent electron trapping, a second learnable weight of the network for equivalent electron detrapping, a third learnable weight of the network for equivalent hole trapping, and a fourth learnable weight of the network for equivalent hole detrapping. In another example, the semiconductor material includes multiple material defects corresponding to the multiple trapping centers. The multiple material defects correspond to different energy levels.

As another embodiment, the loss is calculated with just the free charges. A loss function for calculating the loss includes free electron and free hole charges for each of the voxels. For example, the loss function includes a first weight for free electron charges and a second weight for free hole charges, wherein the first weight is larger than the second weight by at least a factor of 5. In a further example, the loss function is:

$$\text{Loss}_{RM3} = l[(qe_{gt} - qe_L)^2] + n[(qh_{gt} - qh_L)^2]$$

where $\text{Loss}_{RM3}$ is the loss, l is the first weight, $qe_{gt}$ is the free electron charge as a ground truth, $qe_L$ is the free electron charge as estimated by the network, n is the second weight, $qh_{gt}$ is the free hole charge as the ground truth, and $qh_L$ is the free hole charge as estimated by the network.

In one embodiment, the one or more physics-based phenomena include trapping of the holes, transport of the holes, recombination of the holes, trapping of the electrons, transport of the electrons, and recombination of the electrons. As another embodiment, the machine training is with training data including an injected charge into the semiconductor material and ground truth as the signals measured at the electrodes or the free charges measured at the voxels.

As a second aspect, a method is provided for machine training a charge transport network representing a solid-state detector. The solid-state detector is modeled as a physics-based network with defects of the solid-state detector modeled as a single equivalent trapping center. The physics-based network is machine trained where one or more values for a respective one or more learnable parameters of the single equivalent trapping center are learned. The physics-based network as trained is stored.

In one embodiment, the single equivalent trapping center models an equivalent defect representing multiple trapping centers corresponding to different energy levels.

As another embodiment, the one or more learnable parameters include a first learnable weight of the network for equivalent electron trapping, a second learnable weight of the network for equivalent electron detrapping, a third learnable weight of the network for equivalent hole trapping, and a fourth learnable weight of the network for equivalent hole detrapping. The values for the first, second, third, and fourth learnable weights are learned.

In yet another embodiment, the machine training is with ground truth data of only electrode signals or free charge.

In a third aspect, a method is provided for application of a trained neural network modeling physical phenomena of a semiconductor material. An input charge measurement is obtained. A voxel-by-voxel description of free and trapped charges is determined by the trained neural network wherein the trained neural network models multiple trapping centers as and equivalent trapping center. The trained neural network was trained with ground truth of just free charges or just electrode signals. At least a portion of the voxel-by-voxel description is displayed in a graphical user interface.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, they are shown in the drawings embodiments that are presently preferred, it being understood, however, that the invention is not limited to the specific instrumentalities disclosed. Included in the drawings are the following Figures:

FIG. 1B shows a table with properties for two slightly different materials with the electrode configuration shown in FIG. 1A;

DETAILED DESCRIPTION

Figure 1A:
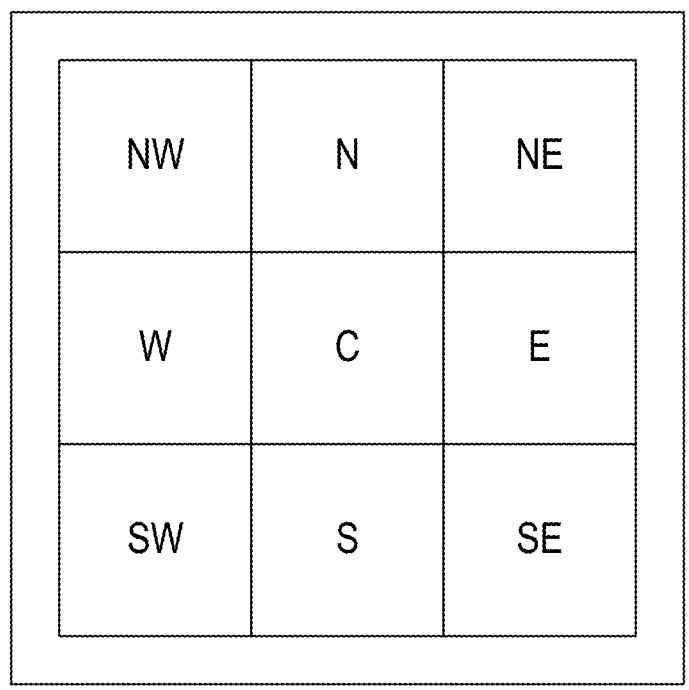
FIG. 1A shows an electrode pattern on a semiconductor detector, according to some embodiments.
Figure 1A:
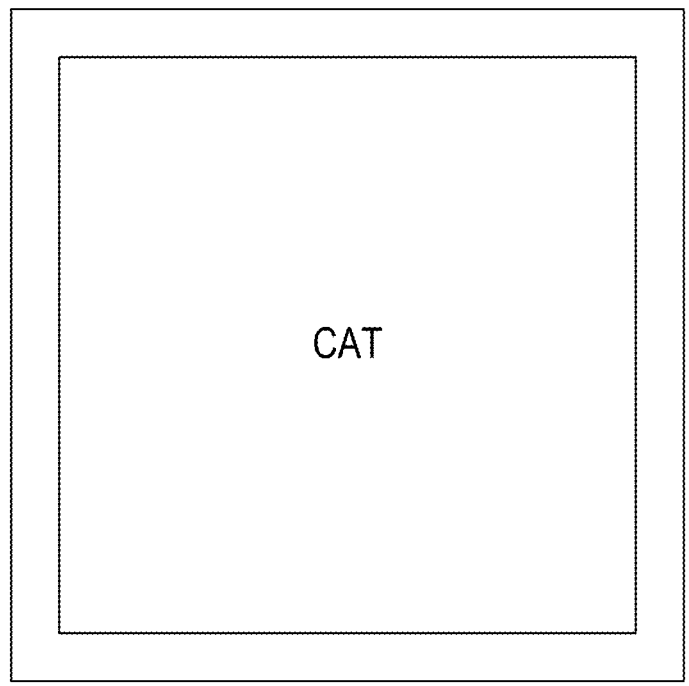

For a deep learning network, a network may be machine trained using just more easily available data (e.g., electrode signals or free charge by voxel) to characterize a room-temperature semiconductor detector (RTSD). The description below is separated into three parts. The first part (PART 1) addresses some example embodiments of neural network training and resulting trained networks. The network is physics-based in that the network models physical phenomena, such as charge and voltage by voxel. U.S. Published Patent Application No. 2021-0133564 describes the first part and is incorporated herein by reference. The second part (PART 2) addresses the use of a weighted combination in the loss used for training the neural network. U.S. Published Patent Application No. US-2022-0366232-A1 describes the second part and is incorporated herein by reference. The third part (PART 3) addresses machine learning-based characterization of a detector at micro-scale using more easily acquired ground truth data (e.g., realistically acquired known data). Regularization and reduced model schemes (equivalency for trapping centers) characterize semiconductor materials using the measurable ground truth data, such as the signal at the electrodes or the free charges of the voxels. Defects can be identified in an equivalent manner using the reduced model or completely using regularization.

In one embodiment of the first part, RTSDs (e.g., CdTe, CdZnTe and TlBr) are modeled as a voxel-by-voxel material characterization, as low as a few microns in voxel sizes. Transport properties and material defects for electrons and/or holes are characterized using a physics-inspired learning model based on transport of charges to find the properties of these materials, such as drift, trapping, detrapping, and/or recombination coefficients for charge carriers electrons and/or holes, hence capturing fluctuations at the voxel scale. The actual physical detector is sub-divided in a 3-D array of voxels in space covering the entire detector volume. Any number of voxels may be used, such as 100, 200, 400, or higher. The model considers different material properties and transforms the properties into connected learnable voxel-by-voxel parameters with appropriate boundary conditions determined by known operating conditions (i.e., voltage applied at the boundaries). Like other traditional learning models, this model is trained by a set of input and output data pairs. The input data are electron-hole pairs injected at voxel locations of the model while the output data are corresponding signals at the electrodes along with charges within the model. Signals in the learning model are calculated dynamically using the Schockley-Ramo theorem. Since signals at electrodes and charges in the voxels change over multiple epochs and time for a single electron-hole injection, this is also considered in the output data. The input-output training data is generated independently using simulation of the transport of charges and solves for the output signals similar to observed actual measurements. A loss function is formulated by considering the mean squared error in the output data generated from this model and ground truth data fed during training the model. Using ADAM or other optimizer, the model is trained for 4000 epochs with a training error of approximately 0.01.

The deep learning-based physical model is used to determine the material properties of RTSD features. The material properties are determined at a fine resolution, such as at microscopic level. The model is physics-based, so has 1-1 relationship between unknown parameters and actual physical parameters (e.g., trapping and detrapping lifetimes, drift coefficients, etc.). The model includes any desired phenomena, such as charge transport, trapping, detrapping, and/or recombination.

In the second part, training of the model uses different weights for different signals in the loss function. In training, different realizations of loss functions can be tested. Many different numbers of combinations exist. Changing the weights of loss function coefficients may improve or degrade the inference method in the deep learning of the physics-based model. Since some of the quantities (e.g., holes and/or electrons charges) being inferred by the model are relatively weak (e.g., faint signature, almost imperceptible by naked eye) as compared to stronger quantities (e.g., voltage or anode or cathode signals), the weights in the loss function may be selected to improve the inference. For example, equal weighting of both strong and weak signals may cause the coefficients for weak quantities (e.g., holes) to be abnormally incorrect in training. By increasing the weight or weights for the weak quantities relative to the strong quantities, the inference of the material properties of the RTSD may be improved.

In the third part, the approaches of the first part, second part, or another neural network as a physical model of solid-state semiconductor are enhanced by use of realistically known data with fewer parameters for identifying the properties of the material. This third approach works with realistic data, such as just the free mobile charges in the material or just the signals due to moving charges at the electrodes, for determining the material properties. Obtaining the signals at the electrodes is straight-forward. Obtaining the free and trapped charges across the volume of the material requires cumbersome experiments and/or simulation. The third approach works on limited data, such as just the free charges or just signals at the electrodes, to identify the properties such as trapping and detrapping probabilities in an equivalent manner. The deep learning-based physical model for determining the material properties of RTSD may have various features: (1) material properties at a fine resolution at microscopic level, (2) model developed with 1-1 relationship between unknown parameters and actual physical parameters such as electric field E and recombination lifetime (for materials with several trapping centers, the model obtains trapping and detrapping lifetimes in an equivalent manner compared to the actual physical parameter, and, for materials with one or no trapping centers, the model obtains 1-1 relation between the unknown parameter and actual parameter), (3) the model includes the phenomena of charge transport, charge trapping and detrapping along with charge recombination, (4) during training, two realizations of loss functions are used—(a) using free charges only, or (b) using signals at the electrodes only, and (5) for training with signals only, regularization techniques are used in order to converge to the actual physical properties. The training of the model with only free charges or only signals results in the model identifying equivalent trapping and detrapping probabilities for multiple trapping centers in the material.

Part 1:

The model is developed from actual physical equations. For example, the detector is characterized with respect to the drift, trapping and other coefficients for both electrons and holes. A one-to-one mapping between the model weights and the detector material properties are provided in a voxelized region. In RTSD, the charge transport properties (both electrons and holes) play a major role in determining the response at the electrodes. The major physical phenomena of the charge carriers are: (i) drift of charges, (ii) free mobile charges getting trapped and de-trapped in defect levels within the material, (iii) recombination of free excess electrons with the intrinsic holes in the material, and vice-versa for free holes.

Systems, methods, and apparatuses are described herein which relate generally to a space time electron-hole charge transport network for solid-state material studies. Briefly, the problem of measuring semiconductor material properties is modeled as a physics-based network with weights that are directly related with the physical properties of the material.

The characteristics of the material are obtained by solving for the weights in an inverse manner. The techniques disclosed herein uses the output signals and input charges to optimally learn the weights of the model. This forms a training pair. The more training pairs utilized, the closer are the learned weights to the actual values. According to some embodiments, a gradient descent-based approach is taken to optimize the weights of the model based on the loss function computation in each step.

In solid-state devices, the properties of the flow of electric current through the material, commonly referred to as charge transport, plays a significant role in determining if one material is better suited for an application compared to another. For example, CdZnTe detectors are known to be plagued by shallow defect levels. Conventional compensation techniques used to increase the resistivity of CdZnTe detectors introduce deep defect levels in the material. In turn, the deeper defects act as trapping centers, trapping free carriers for longer times, degrading the performance of the detectors.

Semiconductor radiation detectors and other solid-state materials are typically characterized by finding the material properties that are relevant to quantify the transport of charges inside the material, i.e., electrons and holes charge mobility $\mu_e$ and $\mu_h$; electrons and holes trapping times for M electrons and N holes trapping centers, $\tau_{e1}, \tau_{e2}, \tau_{e3}, \ldots, \tau_{eM}$ and $\tau_{h1}, \tau_{h2}, \tau_{h3}, \ldots, \tau_{hN}$; and electrons and holes de-trapping for M electrons and N holes de-trapping centers, $\tau_{de1}, \tau_{de2}, \tau_{de3}, \ldots, \tau_{deM}$ and $\tau_{dh1}, \tau_{dh2}, \tau_{dh3}, \ldots, \tau_{dhN}$. De-trapping times can be converted into defect energy levels, such that shallow traps correspond to shorter de-trapping times while deeper traps correspond to longer de-trapping times. Trapping times are related to the density of traps in the material for both electrons and holes. At a microscopic level, the overall effect is observed as a hopping mechanism of charge transport for both electrons and holes. These charges are driven by the electric field until collected by corresponding electrodes, and signals are induced in these electrodes due to the movement of these charges. The coupled system of equations that represent charge transport can be written as:

$$\frac{\partial n_e}{\partial t} + \nabla \cdot (n_e \mu_e \cdot \nabla \phi) - \nabla \cdot (D_e \cdot \nabla n_e) = -\frac{n_e}{\tau_{et1}} + \frac{\tilde{n}_{e1}}{\tau_{ed1}} - \frac{n_e}{\tau_{et2}} + \frac{\tilde{n}_{e2}}{\tau_{ed2}} - \ldots \ldots - \frac{n_e}{\tau_{etN}} + \frac{\tilde{n}_{eN}}{\tau_{edN}} + \delta_e$$

$$\frac{\partial n_h}{\partial t} + \nabla \cdot (n_h \mu_h \cdot \nabla \phi) - \nabla \cdot (D_h \cdot \nabla n_h) = -\frac{n_h}{\tau_{ht1}} + \frac{\tilde{n}_{h1}}{\tau_{hd1}} - \frac{n_h}{\tau_{ht2}} + \frac{\tilde{n}_{h2}}{\tau_{hd2}} - \ldots \ldots - \frac{n_h}{\tau_{htP}} + \frac{\tilde{n}_{hP}}{\tau_{hdP}} + \delta_h$$

$$\frac{\partial \tilde{n}_{e1}}{\partial t} = \frac{n_e}{\tau_{et1}} - \frac{\tilde{n}_{e1}}{\tau_{ed1}}$$

$$\frac{\partial \tilde{n}_{e2}}{\partial t} = \frac{n_e}{\tau_{et2}} - \frac{\tilde{n}_{e2}}{\tau_{ed2}}$$

$$\vdots$$

$$\frac{\partial \tilde{n}_{eN}}{\partial t} = \frac{n_e}{\tau_{etN}} - \frac{\tilde{n}_{eN}}{\tau_{edN}}$$

$$\frac{\partial \tilde{n}_{h1}}{\partial t} = \frac{n_h}{\tau_{ht1}} - \frac{\tilde{n}_{h1}}{\tau_{hd1}}$$

$$\frac{\partial \tilde{n}_{h2}}{\partial t} = \frac{n_h}{\tau_{ht2}} - \frac{\tilde{n}_{h2}}{\tau_{hd2}}$$

$$\vdots$$

$$\frac{\partial \tilde{n}_{hP}}{\partial t} = \frac{n_h}{\tau_{htP}} - \frac{\tilde{n}_{hP}}{\tau_{hdP}}$$

$$D_e = \mu_e \frac{kT}{e}$$

$$D_h = \mu_h \frac{kT}{e}$$

where,
- $n_e$: free electron concentration in excess of equilibrium
- $n_h$: free hole concentration in excess of equilibrium
- $\tilde{n}_{eN}$: trapped electron concentration in defect level N=1, 2, ...
- $\tilde{n}_{hP}$: trapped hole concentration in defect level P=1, 2, ...
- $\tau_{etN}$: electron trapping lifetime in defect level N=1, 2, ...
- $\tau_{htP}$: hole trapping lifetime in defect level P=1, 2, ...
- $\mu_e$: mobility of free electrons
- $\mu_h$: mobility of free holes
- $D_e$: diffusion coefficient of free electrons
- $D_h$: diffusion coefficient of free holes
- $\delta_e$: electron source term
- $\delta_h$: hole source term
- $\emptyset$: electrical potential
- e: charge of an electron
- and other terms, $$\nabla^2 \emptyset = -k \frac{e}{\varepsilon_0}(n_e + \tilde{n}_{e1} + \tilde{n}_{e1} + \tilde{n}_{e2} + \ldots + \tilde{n}_{e2} + n_h + \tilde{n}_{h1} + \tilde{n}_{h2} + \ldots + \tilde{n}_{hP})$$

where, $$E = -\nabla \emptyset$$

At a microscopic level, the system described by the above equations is analytically solved with the source $\delta_e$ and $\delta_h$ given by the electron-hole pairs generated by photon interactions in the material or by other types of interactions, where the number of electrons and holes initially created is proportional to the material band-gap. The various trapping and de-trapping levels of electrons and holes are considered. A history of previous time steps is recorded as a function of time. Also, the effect of recombination between electrons and holes amongst different trap levels and charges in conduction and valence bands is calculated. In addition, electron and hole charge diffusion is also solved in the model.

Figure 1C:
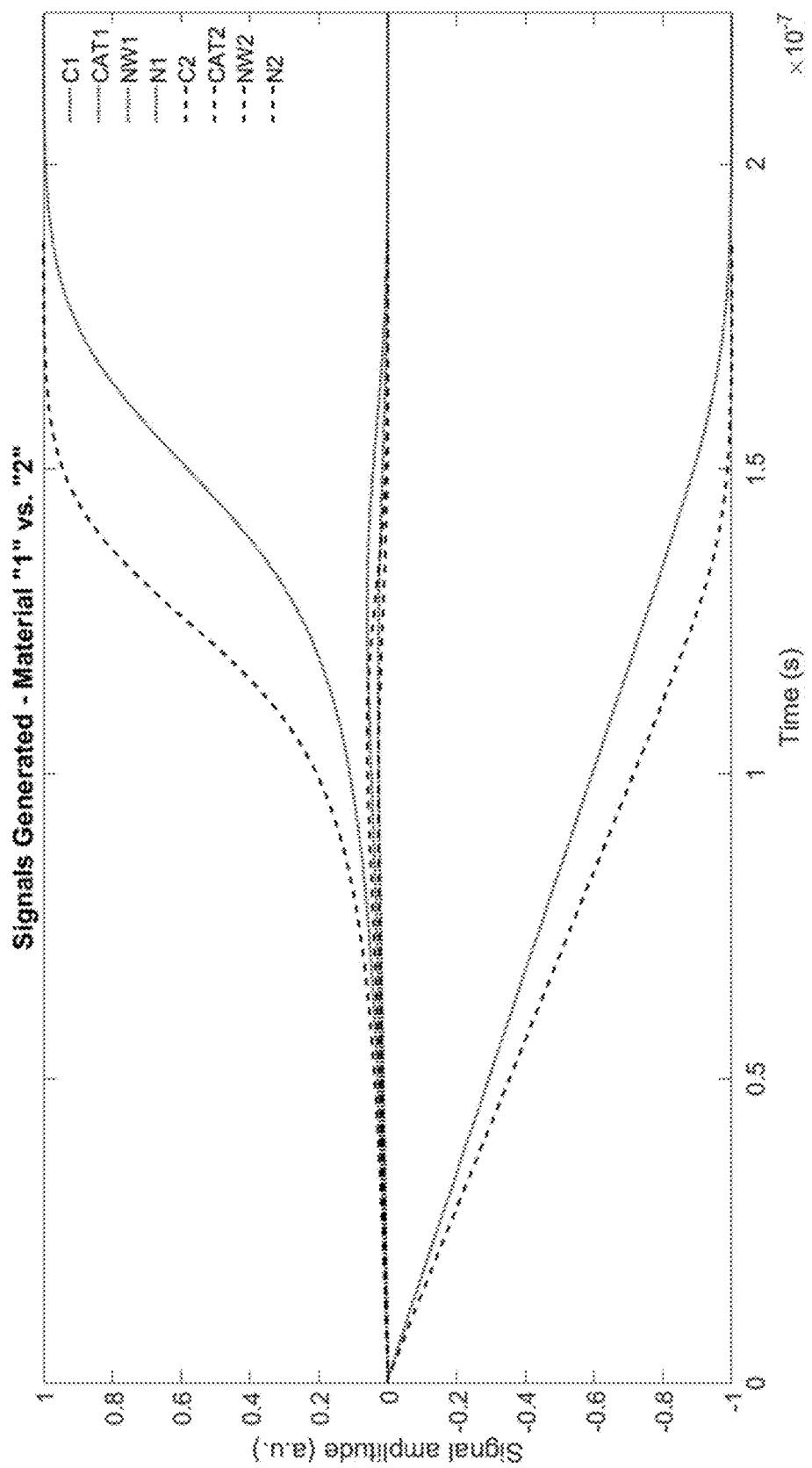
FIG. 1C shows the signals corresponding an electrode pattern on a semiconductor detector, according to some embodiments.

Signals measured in solid-state detectors arise from the drift of charges moving in bulk of the material, i.e., electrons and holes. These signals can be measured using a charge-sensitive amplifier with the addition of other analog and digital electronics. For example, FIG. 1A shows an electrode pattern on a semiconductor detector (CdZnTe) showing 09 (nine) electrodes (NW, N, NE, W, C, E, SW, S and SE) on the anode side, and a single large electrode on the cathode side (CAT). FIG. 1B shows a table with properties for two slightly different materials with the electrode configuration shown in FIG. 1A. FIG. 1C shows the signals simulated corresponding an electrode pattern on a semiconductor detector (CdZnTe) showing 09 (nine) electrodes (NW, N, NE, W, C, E, SW, S and SE) on the anode side, and a single large electrode on the cathode side (CAT).

In contrast to conventional, analytical solutions for solving the nonlinear transport equations set out above, the techniques described herein formulate the transport problem in a neural network framework that incorporates the underlying laws of physics. This framework applies deep learning methods to use multiple layers of the network to progressively extract phenomenon related to semiconductor evaluation from the raw input. The physics-based network described herein may be implemented, for example, by Tensorflow™ (by Google) or PyTorch (by Facebook) on a CPU/GPU computing platform for forward modeling. One example CPU/GPU computing platform is described below with reference to FIG. 6.

The physics-based network discussed herein address four phenomena related to semiconductor evaluations: transport of electrons and holes; trapping and de-trapping of electrons and holes; recombination of electrons and holes; and diffusion of electrons and holes. Each of the phenomena is modeled in the network as one or more weights. The basic unit of computation in this neural network is the voxel (equivalently referred here as a node) that receives inputs from other voxels (nodes) in the network. Each voxel has been modeled with physics-based equations. Weights (learnable parameters) are learned during the training process. The physics-based network described herein is trained using a pair of output signals (from the electrodes) as well as input charge to a discrete element of the material. The physics-based network determines the weights that are identical to the exact parameters estimated from simulation and theoretical calculations. In some embodiments, the loss function for training the physics-based neural network is calculated using the L2 norm of the difference between the output training signals and the signals generated by the network during training. In other embodiments, other formulations of the loss function may be used.

The semiconductor material is assumed to be composed of N voxels. This represents a discretization of the sensor in space. Spatially, the semiconductor material has a cathode on one end and anode on the other end. Charges move from the electrode of one polarity to another—i.e., the electrons move from cathode to anode and holes move from anode to cathode. While the charges transport, the phenomenon of transport, diffusion, trapping, de-trapping and recombination occurs. Assuming causality holds, voxels may be modeled as nodes in space and time, which leads to the formation of "static" space-time fabric. Ideally, the dimensions of the voxel should be as small as possible. However, voxel size is inversely proportional to the computational time required to execute the physics-based network. Thus, the dimensions of each voxel can be selected to allow the physics-based network to execute within a desired run time.

Figure 2:
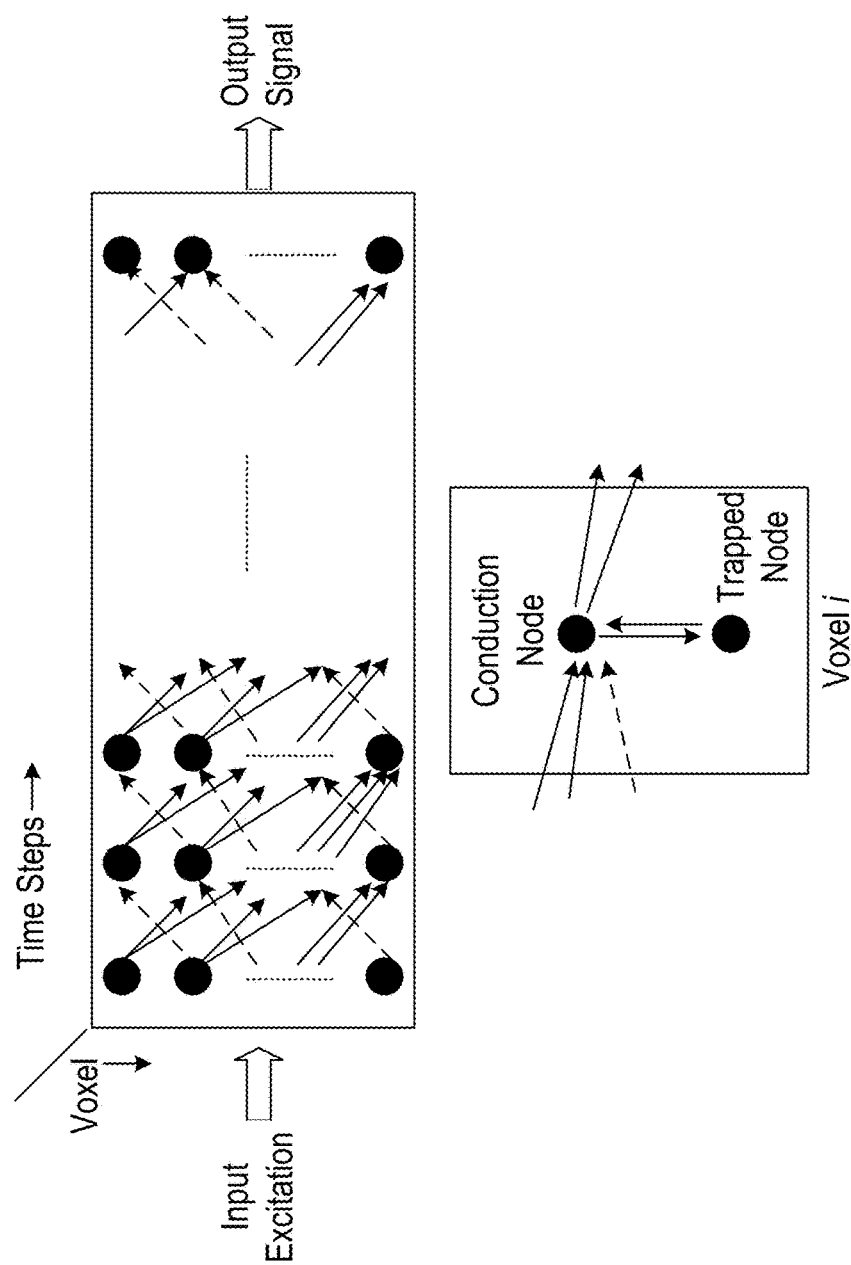
FIG. 2 shows a conceptual view of the space-time model of a semiconductor material that forms the basis of the network, according to some embodiments.

FIG. 2 shows a conceptual view of the space-time model of a semiconductor material that forms the basis of the physics-based network, according to some embodiments. The top image in FIG. 2 shows how charges propagate between voxels over time. Note that the arrows are going up and down because there are electrons and holes that move in opposite directions. As shown in the bottom image in FIG. 2, each voxel comprises a conduction node and a trapped node, just as in the physical model. The conduction node facilitates movement of the charge between voxels, while the trapped node traps charge in the voxel (as depicted by the arrows between the conduction and trapped nodes). Each voxel has a different response that is dependent on the number of trapping centers present in the material. Thus, although this simplified example shows a single conduction node and a single trapped node, it should be understood that a voxel may have multiple trapped nodes based on the properties of the material.

Figure 3:
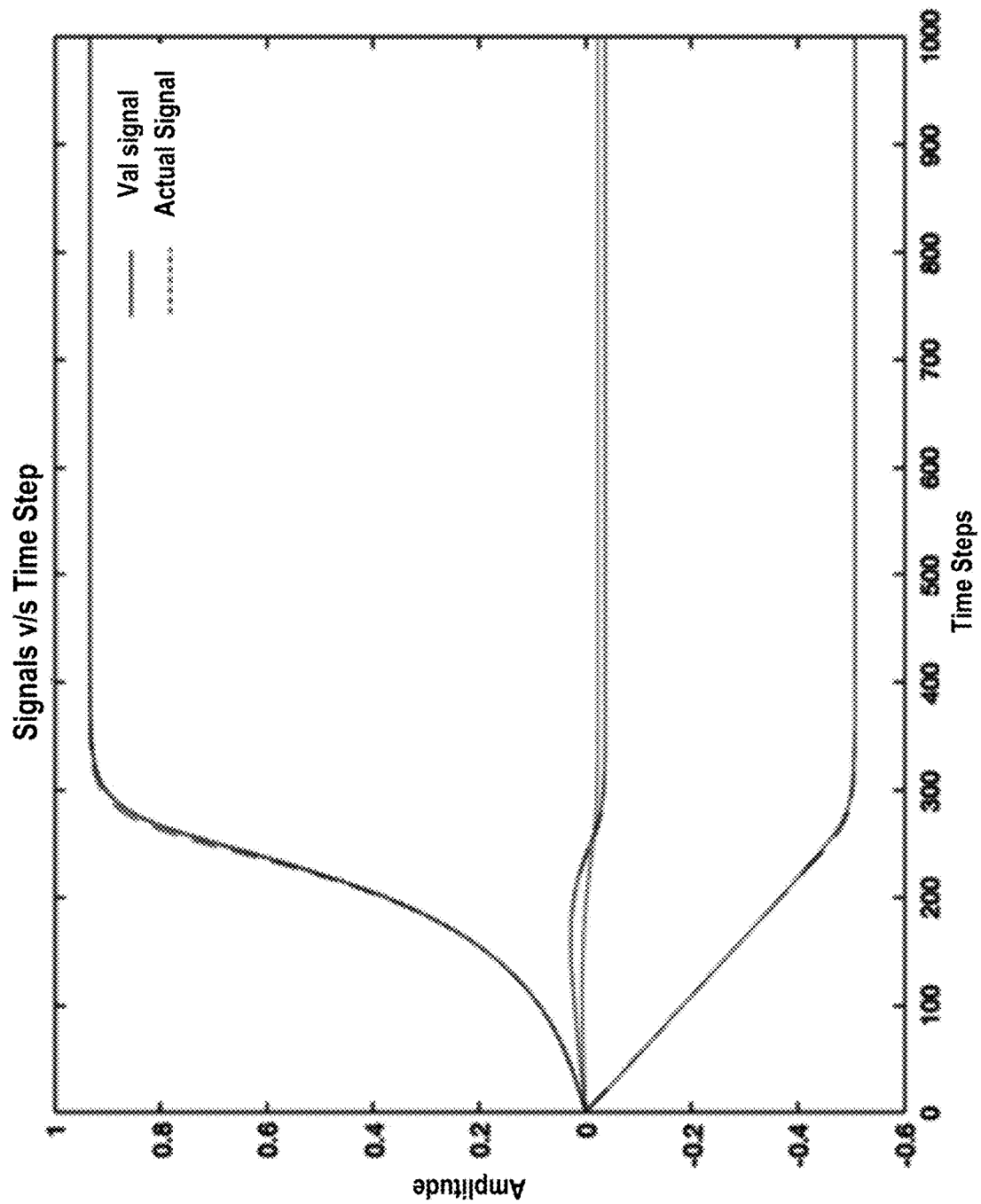
FIG. 3 shows simulated and actual signals for a voxel, according to some embodiments.
Figure 4:
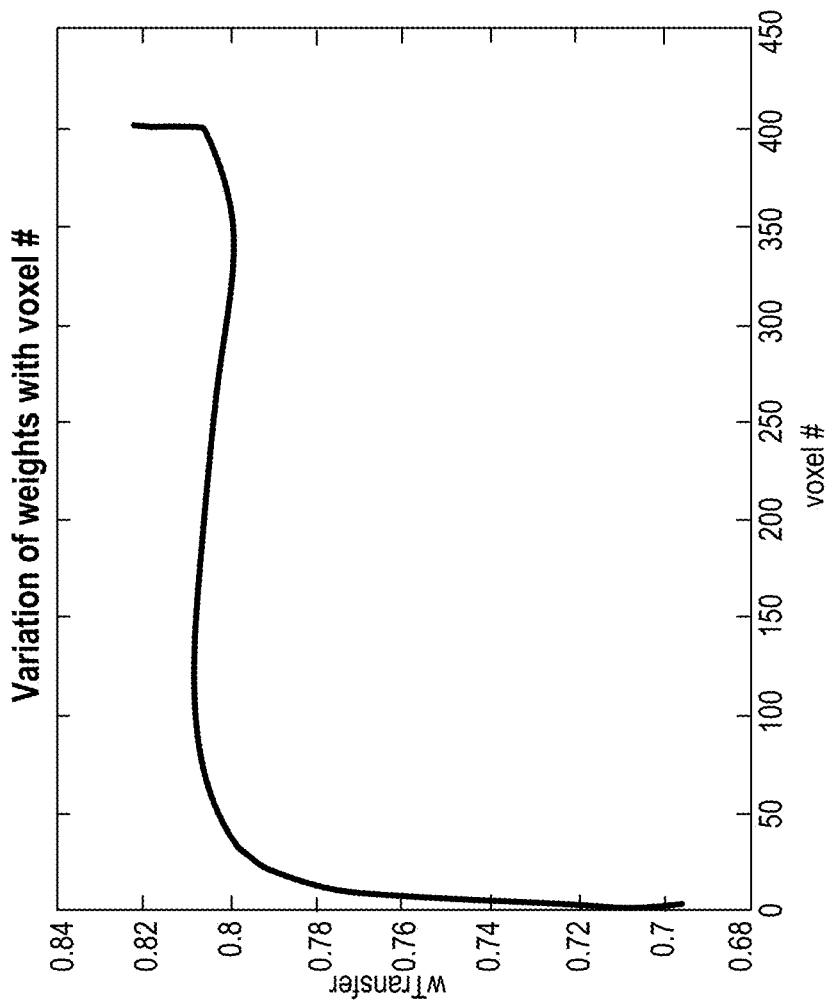
FIG. 4 is a plot that shows the transfer weights as a function of voxel, according to some embodiments.

FIG. 3 shows simulated (val) and actual signals for a voxel using the physics-based neural network described herein according to some embodiments. This figure depicts the different signals in different electrodes. The solid line is the signal that is received as an output of the physics-based neural network using a sample training set, and the dotted line (val) is the ground truth. The accuracy of the machine learning physics-based method is indicated by the amount of overlap of the inferred signal and the ground truth. FIG. 4 is a plot that shows the transport weights as a function of voxel. In this embodiment, the sensor or detector is divided into 400 voxels. The transport weight is correlated with the electric field within the material. The distribution of electric field is a function of position.

The physics-based neural network may be constructed in two phases. First, the network is developed in one-dimensional space and then, the network is expanded in higher dimensional space. As noted above, each of the phenomena (i.e., transport, diffusion, trapping, de-trapping and recombination) is described as a tensor field.

Figure 5A:
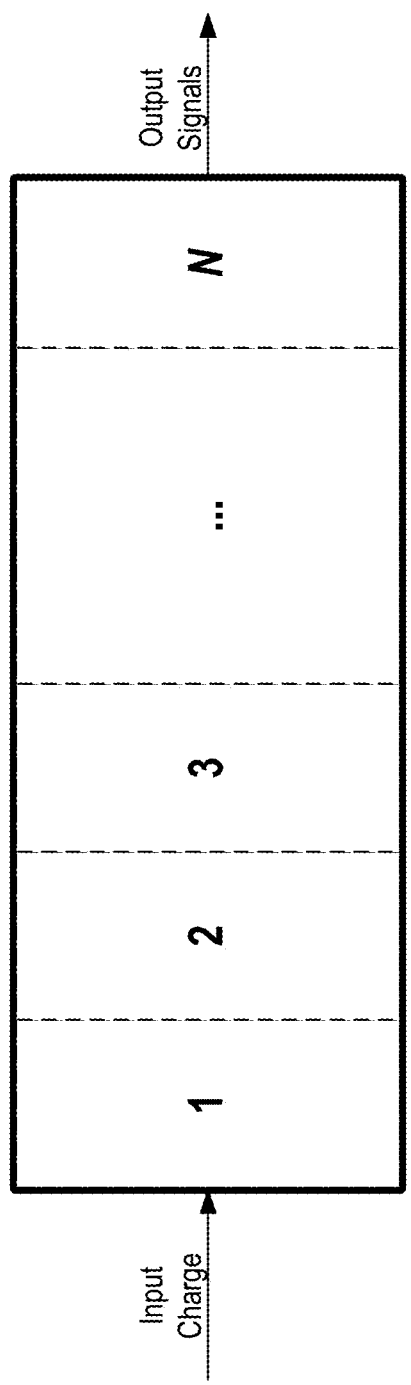
FIG. 5A show the voxel orientation in one dimension, according to some embodiments.
Figure 5B:
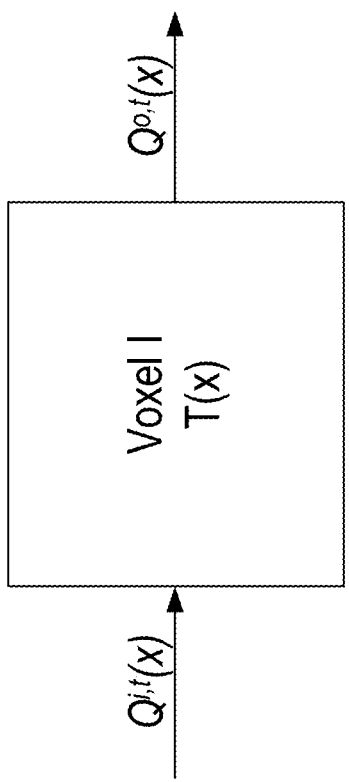
FIG. 5B shows the tensor in one voxel, according to some embodiments.
Figure 5C:
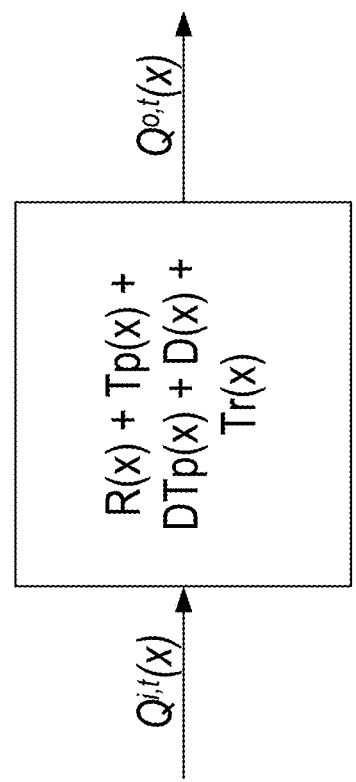
FIG. 5C shows an alternate view of the tensor in one voxel, according to some embodiments.

The incoming and outgoing charges, which are compactly written herein as $Q^{i,r}(x)$ and $Q^{o,r}(x)$, are coupled with a tensor field $T(x)$ at each voxel location at a given position x inside the material. The charges comprise electrons and holes which are propagating in opposite directions. The tensor field $T(x)$ is composed of several tensors, referred to herein as sub-tensors. The transport of charges is mathematically represented by a tensor field $Tr(x)$ at a location given by position x. The trapping of charges is represented by tensor field $Tp(x)$, de-trapping of charges by tensor field $DTp(x)$, diffusion of charges by tensor field $D(x)$, and recombination of electrons and holes by $R(x)$. The tensor field $T(x)$ at a given location is represented as a subnet and is the basic building block of the network. The sub-tensors are combined using mathematical operations in order of the phenomena occurring within each voxel-recombination, trapping, de-trapping, diffusion and transport. The forward direction of electron propagation is positive x direction. So, the forward direction of hole propagation is in negative x direction. The tensor fields for electrons and holes differ spatially. FIGS. 5A, 5B and 5C show the tensors with voxel orientation in one dimension. The same representation is also valid in 3-dimensional case.

The number of unknown weights in the physics-based neural network is exactly equal to the number of unknown parameters in the material (i.e., the number of parameters in the design space). This is the minimum possible parameters of unknown weights. This is in stark contrast with the conventional, non-physics based neural networks where the number of weights is typically much greater (many orders of magnitude) than the number of parameters in the design space. The training time for the conventional, non-physics based neural networks are orders of magnitude higher than the physics-based neural network described herein.

The sub-tensors comprise weights both inside a voxel i, as well as between a particular voxel i with surrounding voxels. This might be thought of analogous to a Long Short-Term Memory (LSTM)/Gated Recurrent Units (GRU) configuration for a particular voxel. However, instead of having an LSTM cell, the weights within each voxel are driven by physics-based phenomena—i.e., trapping and de-trapping from the shallow and deep electron levels along with recombination of electrons and holes.

Figure 5D:
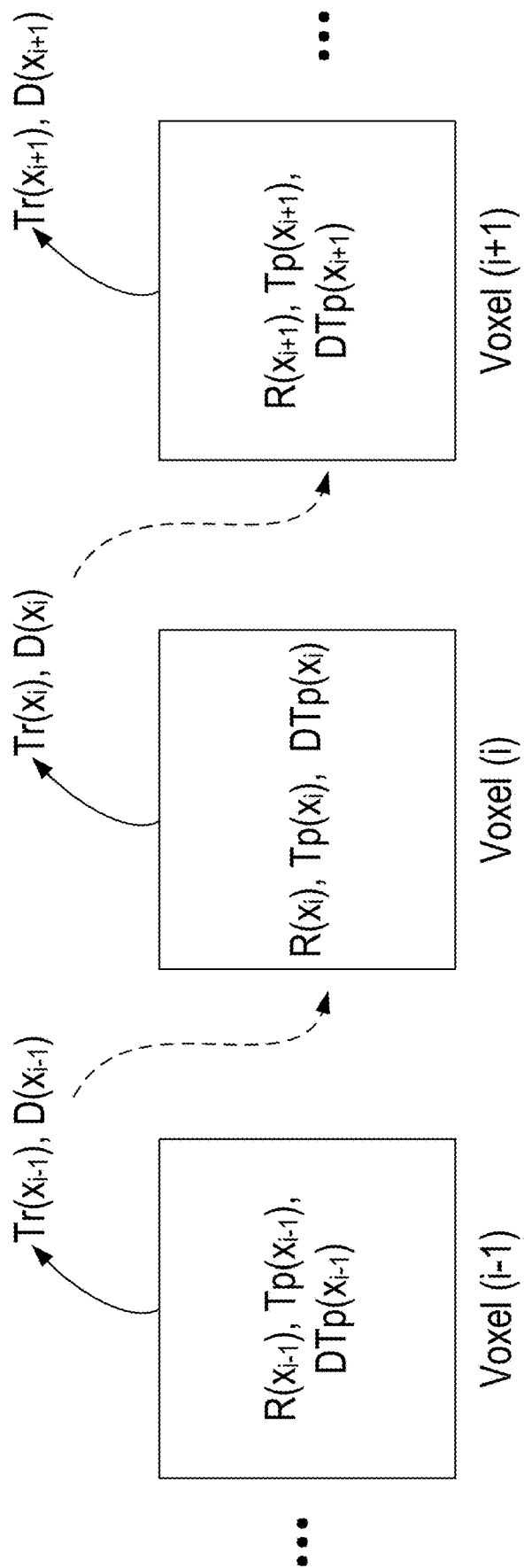
FIG. 5D shows sub-tensors and voxels illustrating this concept.

FIG. 5D shows sub-tensors and voxels illustrating this concept. Inside each of the voxel i, $R(x_i)$, $Tp(x_i)$ and $DTp(x_{i+1})$ occurs while $Tr(x_i)$, $D(x_i)$ represent the diffusion and transport of electrons and holes from one voxel i to neighboring voxels. Since the transport and diffusion of electrons and holes are in opposite directions, each voxel stores the amount of charge due to the electron and due to holes. For example, the transport $Tre(x_i)$ of the electrons is considered to be 5 voxels to the forward x direction, while the transport $Trh(x_i)$ of the holes is considered 2 voxels to the negative x direction. The transport sub-tensor $Tr(x_i)$ is thus a concatenation of $Tre(x_i)$ and $Trh(x_i)$. The diffusion parameters are similarly concatenated. For example, electrons diffuse by 2 voxels in the forward x direction $De(x_i)$ while the holes diffuse by 1 voxel to the negative x direction.

It should be noted that the physics-based neural network described herein does not require several experimental setups or numerous simulations in order to estimate the material properties, as in conventional techniques. Thus, the physics-based network provides an easy way of estimating the microscopic properties of the detector but with the numerical accuracy close to simulations. The physics-based network optimizes itself based on the gradient descent steps depending only on output signals and input charge in the voxels. The boundary conditions drive it to the optimal value of weights which are the material properties. The optimization may be performed based only on the signals without using complicated measurements.

This technique of characterizing the material will increase the ability to identify the material properties and defects in the solid-state materials, including semiconductor detectors. This will, in turn, allow the optimization of materials for an application. This will also reduce wastage of solid-state materials in some applications, where better characterization of defect levels enables the use of materials with lower quality having more defects in them. Finally, these benefits combine to provide a cost saving in materials testing in comparison to conventional techniques.

Part 2:

The accuracy of the physics-based model or network described in Part 1 or another such model may be improved. For example, the accuracy related to hole properties is improved by finding the correct values (ground-truth) for hole quantities that were initially difficult to be found due to "weak" signals and responses given by the transport of holes. Signals generated by the moving of holes in RTSD are inherently difficult to measure due to a much lower mobility of holes and shorter lifetime. But, in order to achieve better spectroscopic performance, hole contribution needs to be included. This is particularly important to RTSD where holes may move relatively faster or live relatively longer (e.g., TlBr-based RTSD). The use of weighted loss with increased weighting for weak signals magnifies or enhances the inference in the model, improving and extending the range inside the material for inferring quantities accurately without degrading the accuracy of the other (e.g., electron) inferred quantities.

The deliberate change to the weights of different physical quantities in the loss function used in the deep learning model enhances the physical quantities that inherently have a "weak" and "faint" presence. This allows for better than state-of-the-art performance when correcting for material imperfections in an actual RTSD. The accuracy for the "weak" and "faint" quantities (e.g., holes and/or electrons transport properties in RTSD) is improved by using the weighted loss function with the weak quantities weighted more greatly than the strong quantities. This occurs where the neural network is physics-based.

Figure 7:
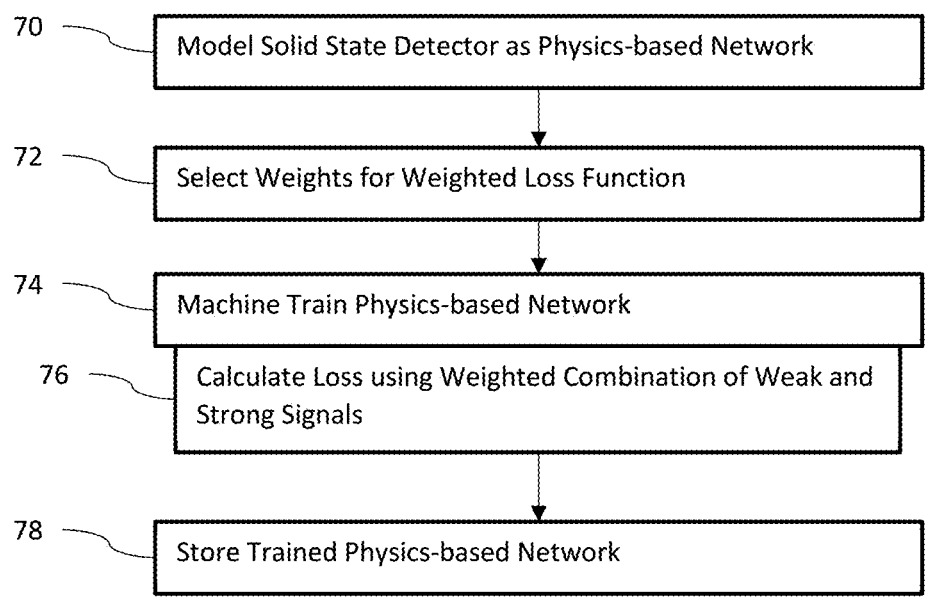
FIG. 7 is a flow chart diagram of one embodiment of a method for training a neural network modeling physical phenomena of semiconductor material.

FIG. 7 is a flow chart diagram of one embodiment of a method for training a neural network modeling physical phenomena of semiconductor material, such as RTSD. The training incorporates the weighted combination in the loss function in order to improve the accuracy with respect to relatively weak signals or physical phenomena. The method is for enhancement of the weak signals in machine training a charge transport network representing a solid-state detector.

Figure 6:
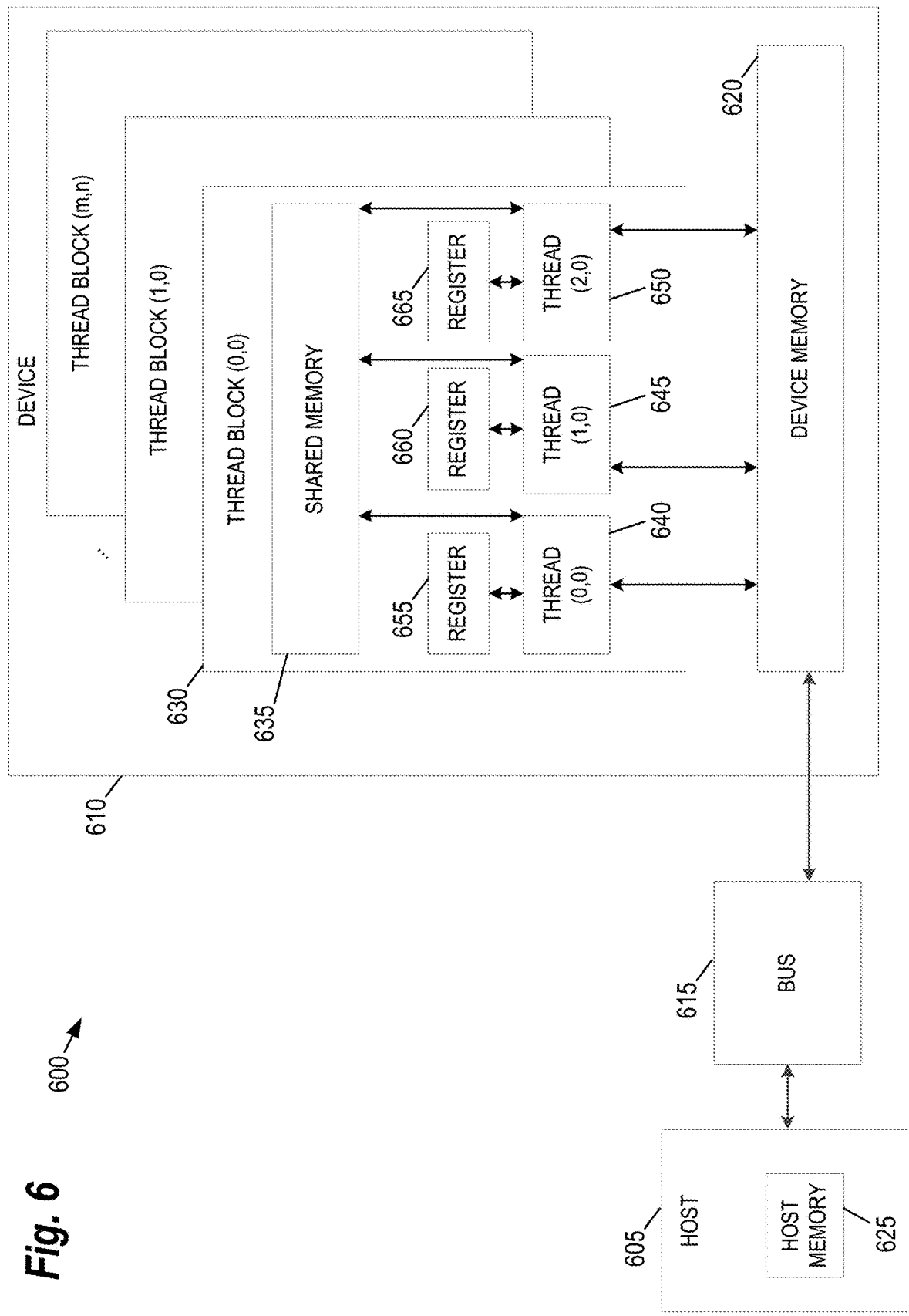
FIG. 6 provides an example of a parallel processing memory architecture that may be utilized to train or execute the network, according to some embodiments.

The method is implemented by the system of FIG. 6 or a different system, such as a computer, server, or workstation and memory. Additional, different, or fewer acts may be provided. For example, act 72 is not performed. Pre-determined weights are used. As another example, the trained physics-based neural network is applied instead or in addition to be stored in act 78.

In act 70, a solid-state detector, such as a RTSD or a non-room temperature semiconductor-based detector, is modeled as a physics-based network. The model is voxelized. For example, any of the models described in PART 1 may be used. The model may be based on a convolutional neural network, fully connected neural network, long-short term memory-based neural network, recurrent neural network, or another neural network but includes physics-based phenomena. The neural network is modeled to include one or more physical phenomena on a per voxel basis so that the training of the model learns to represent material properties of the detector.

Each voxel is represented in the neural network by a tensor field defined by (i) a location of the voxel within the semiconductor material and (ii) one or more physics-based phenomena including transport of holes or electrons within the voxel at the location. The physics-based phenomena include transport of electrons, trapping of the electrons, detrapping of the electrons, transport of holes, trapping of the holes, detrapping of the holes, recombination, voltage, and/or other signals within the voxel at the location. The physics-based phenomena for the whole detector may also include the anode and/or cathode signals.

Signals and corresponding physical phenomena at each voxel include one or more relatively weak signals and one or more relatively strong signals. For example, the modeling includes signal for holes as the relatively weak signal, and the voltage as the relatively strong signal. As another example, the modeling includes a signal for electrons as the relatively weak signal, and the voltage as the relatively strong signal. In other examples, the transport, trapping, and/or detrapping of holes and/or electrons provide relatively weak signals in the modeling for each voxel, and the voltage or signals from the cathode and/or anode provide relatively strong signals in the modeling. The hole signals may be considered relatively weak in relation to the electron signals.

In act 72, the weights of the different physical phenomena or signals are selected. At least two weights are provided for two or more phenomena or signals, respectively. Different weights are used for strong verses weak signals. The same or different weights may be used for different weak and/or different strong signals. Multiple measurements used in the loss function are weighted differently.

The loss is a weighted combination of different signals and/or quantities modeled in the physics-based network. For example, anode and/or cathode signals, voxel voltages, the transport of the holes and/or the electrons, the trapping of holes and/or electrons, the detrapping of holes and/or electrons, recombination, and/or other signals have terms in the loss function. These terms are directly weighted or indirectly weighted in the weighted combination forming the loss function. For example, one weight in the weighted combination is for the transport of the holes, another weight in the weighted combination is for the transport of electrons, and a third weight in the weighted combination is for the voltage. Unity or no weighting may be provided for none, one, or more of the terms in the loss function. In one embodiment, the loss includes calculated losses for the anode or cathode signals and voxel voltage, trapping of the holes, the transport of the holes, trapping of the electrons, the transport of the electrons, and/or other signals in the weighted combination.

In general, a loss function is a combination of terms. The weighted loss function adds coefficients or regularization coefficients as weights for one or more of the terms. For example, the weighted loss function is a sum of terms with weights for each of the terms. The weights may be unity (1.0) or another value. Summation, multiplication, subtraction, division, and/or other relationships between terms may be used.

In one embodiment, the loss to be used in machine training of the physics-based model is given by:

$$\text{Loss} = k[(\text{signals})^2 + (\text{voltages})^2] + l[(\text{free electrons})^2 + (\text{trapped electrons})^2] + n[(\text{free holes})^2 + (\text{trapped holes})^2]$$

where the signals are the signals at the anode and cathode, the voltages are the voltage per voxel, the weight of the signals and voltage terms is k, weight of electrons is I, and the weight for the holes is n. Other loss functions may be used. A mean squared error loss based on this loss function is used, but other losses (e.g., mean absolute error) may be used. In the loss function, errors due to the signals and voltage are grouped together with a weighting term k, while the free and trapped charge electron and hole charges are grouped together with weighting terms l and n, respectively. In one embodiment, a linear voltage distribution over all the voxels is used with the anode voltage as Vmax volts and cathode voltage as 0 volts. The error between this reference voltage distribution and voltage distribution computed from the model is included in the loss function. One weight is applied to a sum for the transport and the trapping of holes, another weight is applied to a sum for the anode or cathode signals and the voxel voltage, and yet another weight is applied to a sum for the transport and the trapping of the electrons.

Other weighted combinations may be used. For example, the weights are split (i.e., additional weights are used). Instead of each weight being for a sum, separate weights are provided for each term of each sum. An example weighted loss function is given by:

$$\text{Loss} = k1(\text{signals})^2 + k2(\text{voltages})^2 + l1\left[(\text{free electrons})^2\right] + l2\left[(\text{trapped electrons})^2\right] + n1\left[(\text{free holes})^2\right] + n2\left[(\text{trapped holes})^2\right].$$

By using weights k1, k2, l1, l2, n1 and n2, particular properties of interest are weighted separately rather than grouping electron properties in general and grouping hole properties in general for weighting. Other loss functions of a combination of weights may be used, including loss functions with additional, different, or fewer properties and/or weights. In a more general form, the loss function is a stochastic objective function with suitable Lp-norm:

$$\text{Loss} = k1 * f1(\text{signals}) + k2 * f2(\text{voltages}) + l1 * f3[(\text{free electrons})] + l2 * f4[(\text{trapped electrons})] + n1 * f5[(\text{free holes})] + n2 * f6[(\text{trapped holes})].$$

where $f1$, $f2$, $f3$, $f4$, $f5$, and $f6$ denote functions of their argument, such as, for example, the L2 and L1 norms, and the Lp norm (where p<1).

To machine train in act 74, the values for the weights are selected in act 72. The selection may be manual or automated. For example, a predetermined or stored weight is loaded and used in training. As another example, an iterative loop of selecting weights and training is performed, where each iteration uses different weights. The resulting performance of the machine-trained model (e.g., mean error) is measured. By testing different values for the weights, the resulting model with an optimized performance (e.g., minimum mean error) may be identified.

Any search pattern may be used in testing different weights. Local or overall minima may be located. The weights with a minimum loss or loss below a threshold level across the voxels are determined and selected. Different weak signals are weighted the same or differently. Different strong signals are weighted the same or differently. The weights for one or more weak signals may be the same as for a strong signal but at least one weak signal is weighted more greatly than at least one strong signal in order to select weights resulting in a minimum loss in performance of the physics-based network.

In act 74, a processor machine trains the physics-based network. Deep learning is performed using training data. The values of the learnable parameters (weights) of the network are optimized based on the loss function comparing output of the network to the ground truth in a number of iterations or epochs. The overall loss is to be minimized over the corpus of training data by finding the optimum values of the learnable parameters of the network.

Any optimization method for stochastic objective functions may be used. In one embodiment, ADAM is used. Other gradient descent methods may be used.

The training data is from simulation, actual measurements, and/or another source. The training data includes the input charge and location as well as the ground truth signals resulting from that input, such as the voltage distribution, anode signal, cathode signal, any number of electron properties, any number of hole properties, and/or other phenomena by voxel. The training data may be formed from either or both of actual measurements and simulated measurements (augmentation). For example, the voltage distribution over the voxels and anode and cathode signals may be measured from physical detectors given an input charge and location. The signals for the other properties are provided by simulation, augmenting the training data. As another example, all the signals may be measured for multiple samples of training data, and simulation used for all the signals for additional samples. The actual measurements and any augmentation, such as through simulation or synthesis, forms the training data for a physical RTSD.

The physics-based neural network is machine trained using a weighted combination of losses calculated in act 76. The loss function includes a loss with respect to a relatively weak signal and a loss with respect to a relative strong signal. For example, losses for weak signals may include transport, trapping, and/or detrapping of holes and/or electrons. A loss may be provided for recombination. The losses for strong signals may include the voxel voltage and/or the anode and/or cathode signals. The electron coefficients may be considered strong relative to the hole coefficients. The different losses are combined in the loss function for the machine training. The weighting for one or more weak signals or properties is greater than the weighting for one or more strong signals. Any difference in weighting may be used. For example, the value of the weight for the weak signal is at least double, at least one order of magnitude, at least two orders of magnitude, at least three orders of magnitude, any other multiple of the value of the weight(s) for a strong signal, all of the strong signals, or any of the strong signals. The loss for the weak property is weighted more greatly than the loss for one, more, or all of the strong properties. For example, increasing the value of the regularization coefficients for the "weak" and "faint" quantities by a factor of about 100 relative to "strong" and "larger" quantities results in accuracy improvement in the trained neural network. About is used in this context as +/−10. The weights for the transport, trapping, detrapping, and/or other characteristics of electrons and holes is greater (e.g., second order of magnitude greater) than the weight for the anode or cathode signals and/or voxel voltage.

The processor calculates the loss as part of machine training. The difference between the ground truth in the training data and the estimated output generated by the physics-based neural network using the tensor field during training is calculated. Any error function may be used, such as a mean squared error (L2) or mean absolute error (L1). The physics-based model is trained by the input electron and hole injection pair and the corresponding output signals at the electrodes, along with free and trapped charges in each voxel. The loss error is computed as the sum of the mean squared error (M.S.E.) between the output from the model and ground truth output data, such as shown in the loss functions described above. In one embodiment, one defect level is provided for trapping. Multiple defect levels may be used (e.g., more trapping and/or detrapping centers for electrons and/or holes). Electron and hole transport and trapping at the one defect level is provided with the corresponding loss being given by:

$$\text{Loss} = k[(sg_{gt} - sg_L)^2 + \text{loss}_{voltage_{points}}] + l[(qe_{gt} - qe_L)^2 + (qet_{gt} - qet_L)^2] + n[qh_{gt} - qh_L)^2 + (qht_{gt} - qht_L)^2].$$

where q in this loss equation is a charge for trapped or free levels of holes and electrons in each voxel. Different values of the weights k, l, n may be used. Some representative weights that could be tested are: k=[0.1, 1, 10, 100], l=[0.1, 1, 10, 100], n=[0.1, 1, 10, 100]. The error of the trained RTSD weights (parameters) is calculated as a mean square error over the voxels N, represented by:

$$MSE_w = \frac{1}{N}\sum_{i=1}^{N}(q_{L,i}w_{L,i} - q_{gt}w_{gt,i})^2$$

where, $(q_{L,i}$ and $q_{gt} > 1\times10^{-5})=1$, $(q_{L,i}$ and $q_{gt} <= 1\times10^{-5})=0$, and w represents the properties or quantities being learned. Another calculation uses the mean square error represented as:

$$MSE_w = \frac{1}{N}\sum_{i=1}^{N}(w_{L,i} - w_{gt,i})^2$$

where the product with the charge is not used. Other error metrics may be used as well.

For a given injected electron and hole pair or charge at a given voxel, the material properties are calculated over a range of voxels at each of a range of times. For example, the electron-hole pair is injected at voxel 70 along a line of voxels. The hole properties are computed for voxels number 50-70, and the electron properties are computed for voxels number 70-100. The range of trained weights in the voxels depend on the trapping, detrapping and transport properties of electrons and holes within the material. Other ranges may be used. The property distribution over two or three dimensions, such as along electric field lines, may be used as well.

Using the weights in the weighted combination in the loss function separates the weak and faint quantities from strong and larger quantities (e.g., (a) holes as compared to electrons or voltage or (b) electrons as compared to voltage). A parametric analysis of the coefficients [k, l, n] shows the cause-effect that these relative weights have with respect to another. In the loss function, increasing the value of the regularization coefficients for the "weak" and "faint" quantities by a factor of ~100 relative to "strong" and "larger" quantities shows improvement in the accuracy of the machine-learned network (i.e., shows a lesser minimum error). Increasing further may degrade the overall performance by degrading the inference of the "stronger" and "larger" quantities. For example, the weight (e.g., k) for the stronger signals is 0.05-0.15, the weight for the electrons (e.g., l) is 50-150, and the weight for the holes (e.g., n) is 50-150. For instance, if n is higher than l, minor variations in the charges due to holes and charges trapped in the hole centers are captured. This not only provides a detailed variation of the loss function with different parametric weights but also identifies the best combination of these weights to provide the minimum loss. This approach of finding the logic behind the best possible parameters aids in identifying the relative weights of one parameter in comparison to another, which in turn improves training the learnable parameters of one of the charges (e.g., holes) in more details in comparison to the other charge (e.g., electrons).

Figure 8A:
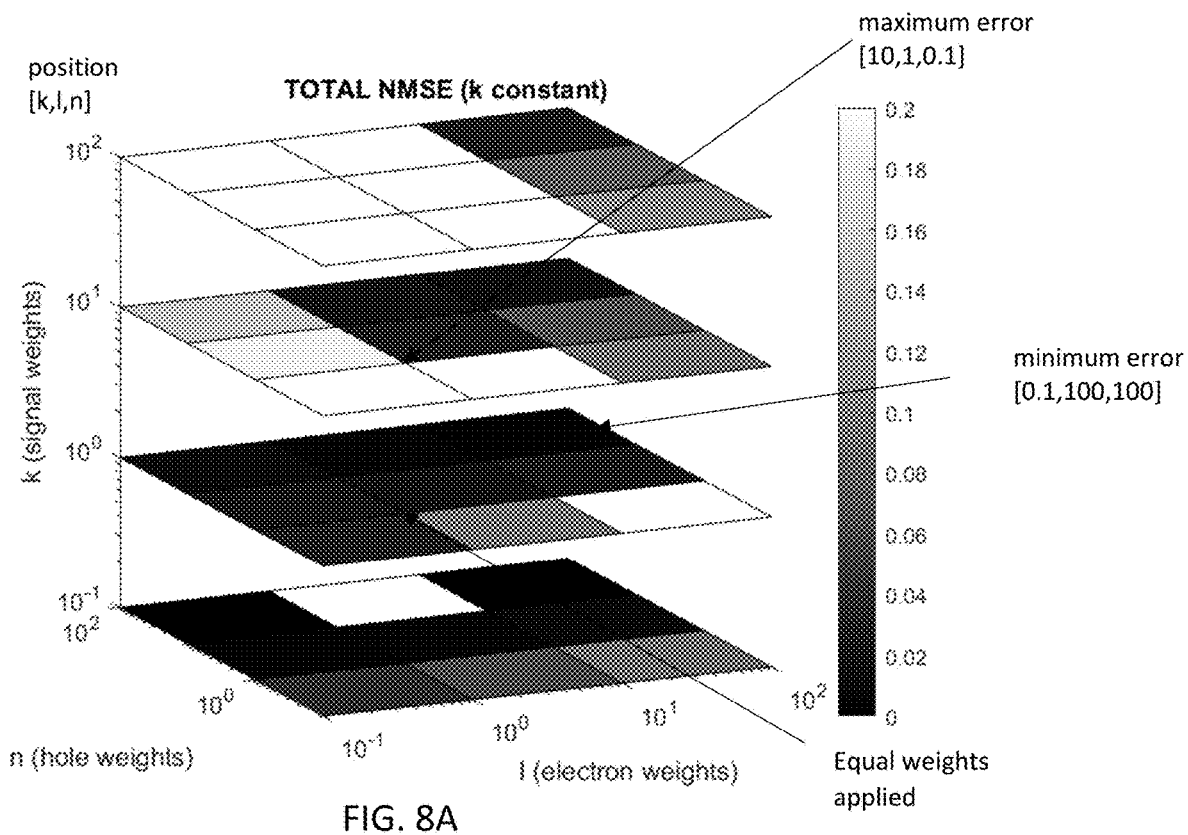
FIGS. 8A-C illustrate overall error minimization examples resulting from different combinations of weights in the loss calculation.
Figure 8B:
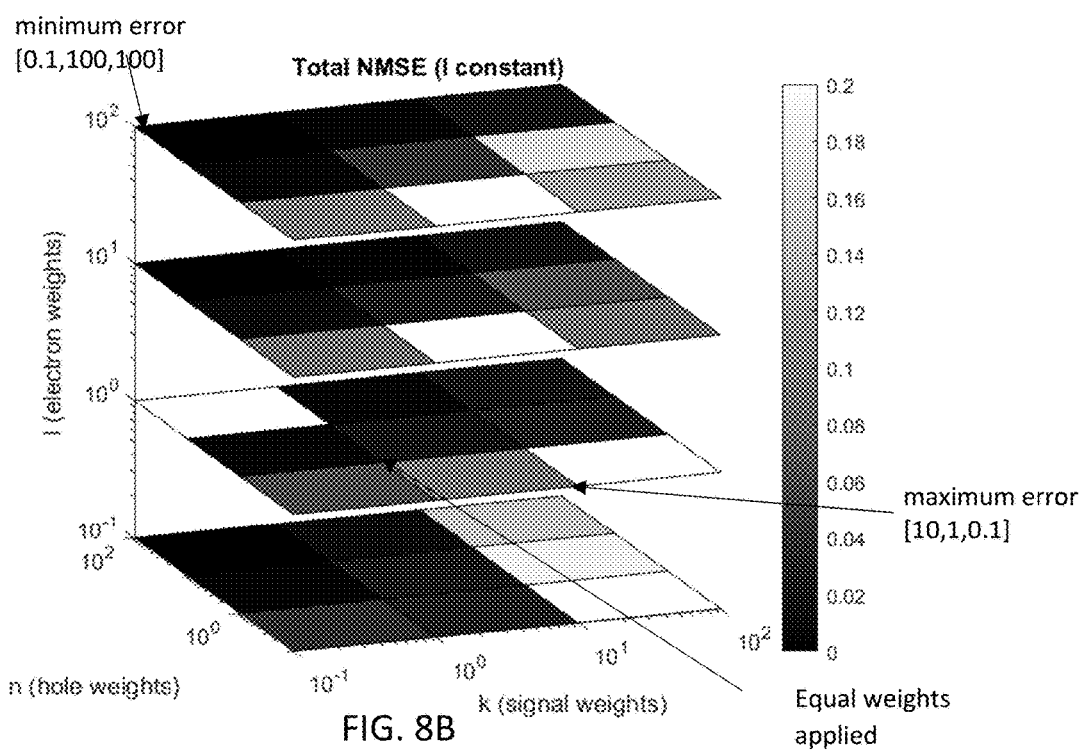
Figure 8C:
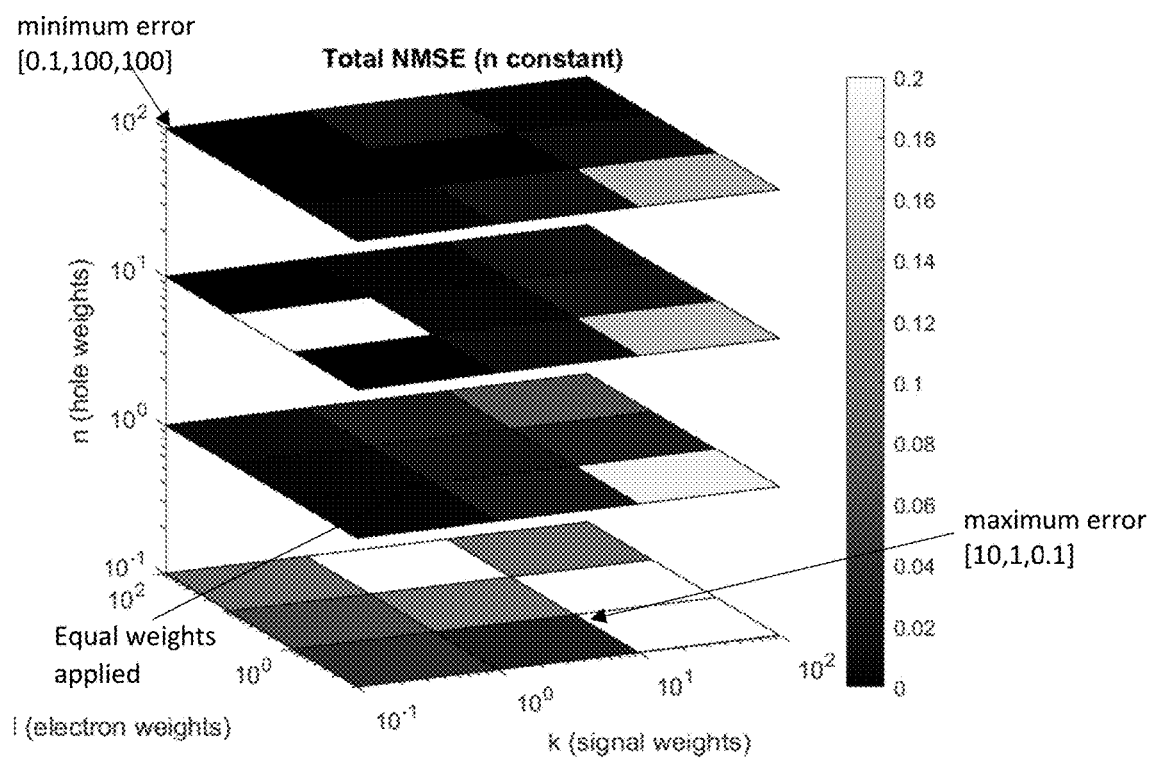

FIGS. 8A-C show examples of a 3D mapping of the normalized mean square error (NMSE) using different weight values for k, l, and n. FIGS. 8A, 8B and 8C show the total (sum over voxels and/or time) NMSE for varying k, l, and n values, respectively. The optimum values for each weight may be found sequentially or jointly. Based on the mappings, the minimum error is provided with the weights of k=0.1, l=100, and n=100. The maximum error is given with weights of k=10, l=1, and n=0.1, showing that the values of the weights affect performance of the machine trained physics-based network. The combination of weights providing a sufficient or threshold level of error are identified, such as the minimum error, an error a given % below the maximum, or an error below an absolute threshold (e.g., 0.1). By weighting the electron transport and trapping and hole transport and trapping about 100 to 1,000 times greater than the cathode and anode signals and the voxel voltage, a lesser error results from the trained network. Any performance measure for the error of the network may be used, such as L1 or L2 averaged or summed across the voxels and/or time. Other relative weights may be provided, depending on the model.

Figure 9A:
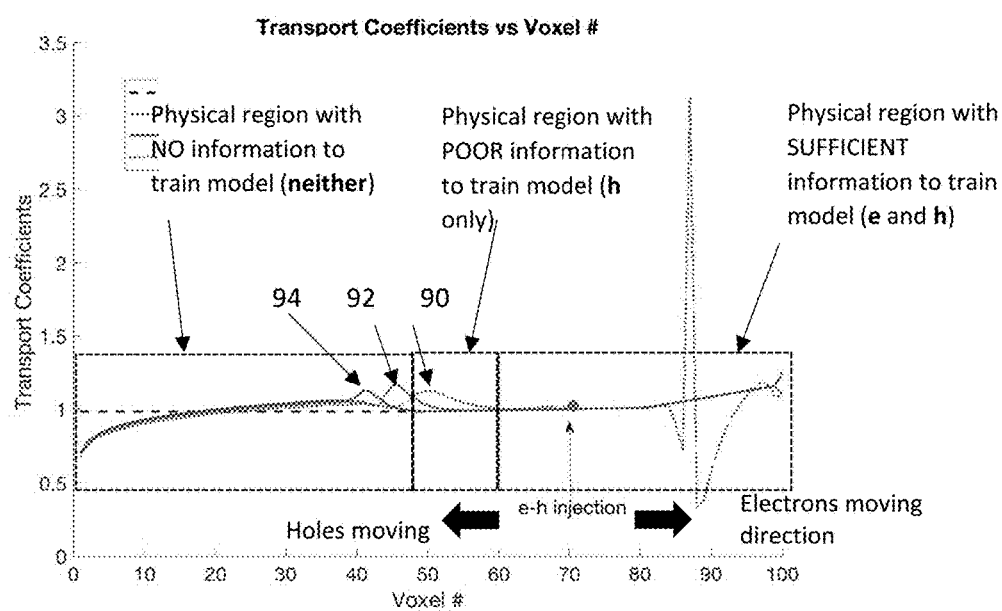
FIG. 9A is a graph showing an example extension or magnification of the range of holes provided by unequal weights in the loss calculation.
Figure 9B:
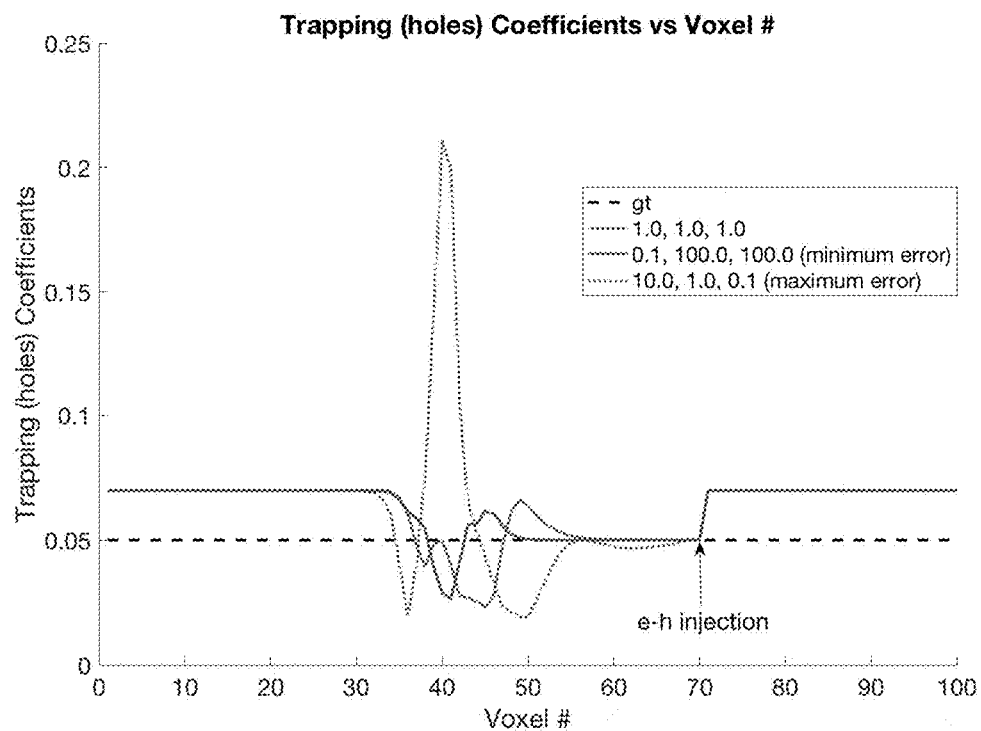
FIGS. 9B-9E are graphs showing examples of trapping and detrapping coefficients of holes and electrons.
Figure 9C:
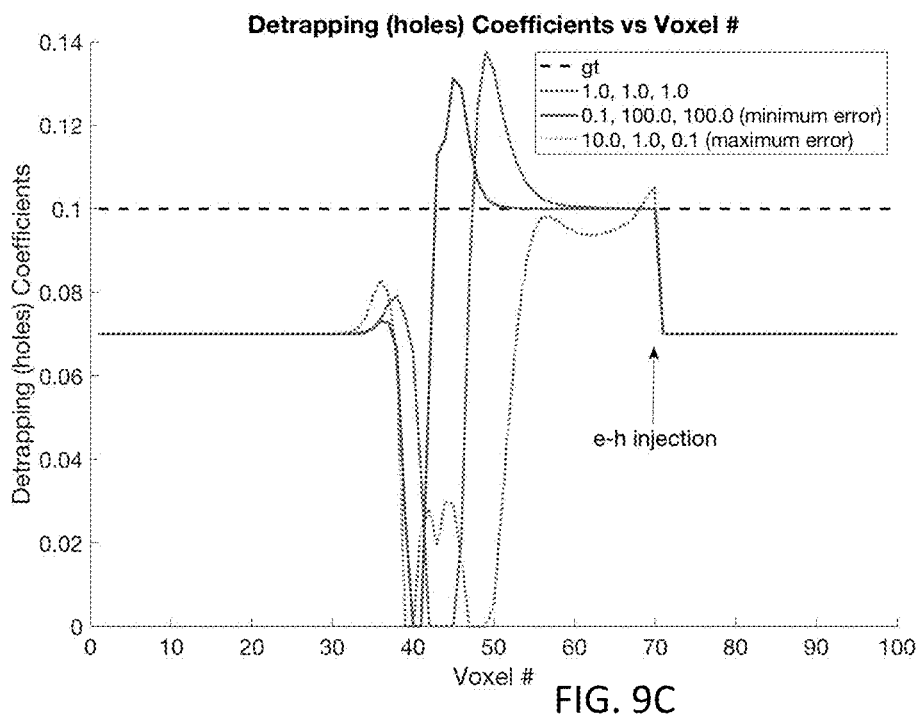
Figure 9D:
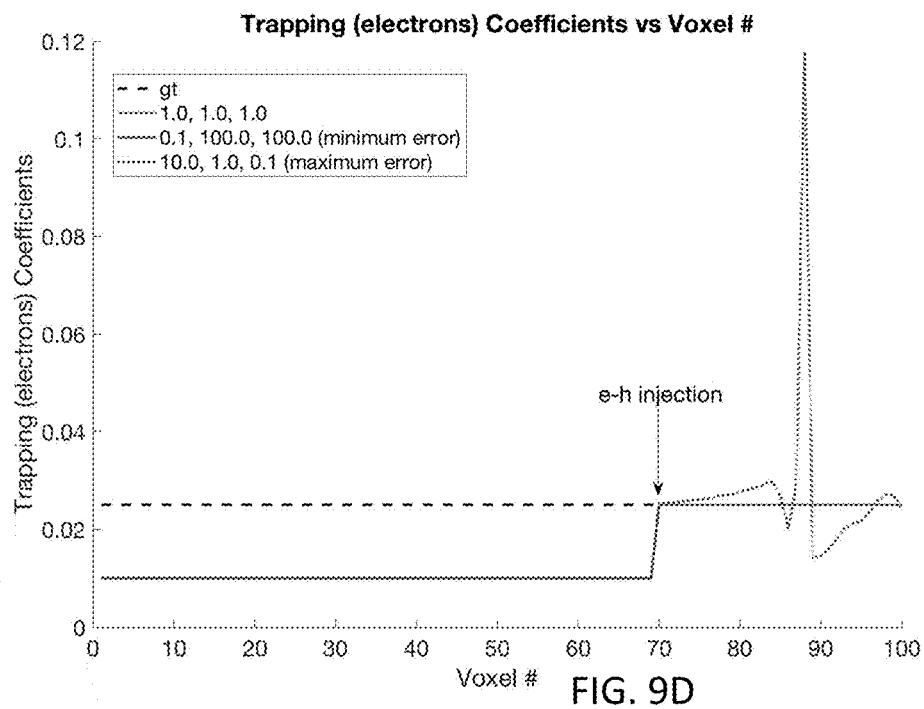
Figure 9E:
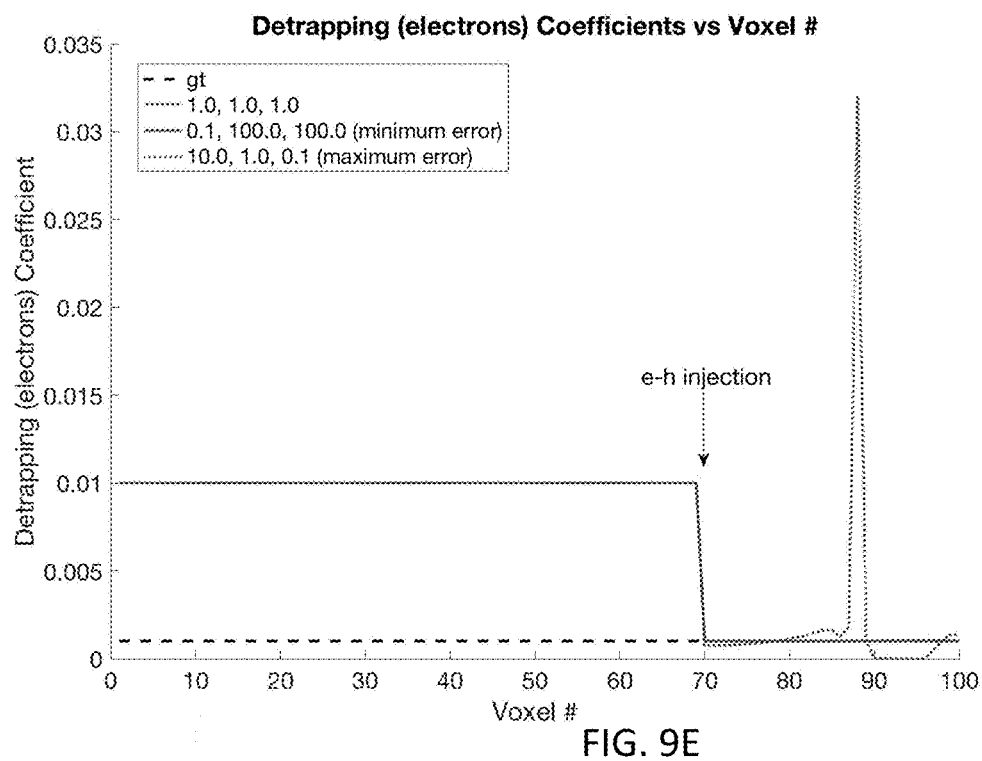

The relative weighting in the loss calculation for training provides for the model to have a greater spatial range for the weaker signals due to boosting by the increased weight. For example, the transport of holes extends over a greater range of voxels away from the injected locations. FIG. 9A shows an example of the enhanced inference improving and extending the range inside the material while providing acceptable accuracy of holes inferred quantities without degrading the accuracy of the electrons inferred quantities. The example of FIG. 9A is for transport weights along one dimension but may be extrapolated to two or three dimensions. The horizontal dashed line represents the ground truth. The curve 90 represents the predicted hole transport coefficients for the weights providing the maximum error [k=10.0, l=1.0, and n=0.1], the curve 92 represents the hole transport coefficients for unity or equal weights [k=1.0, l=1.0, and n=1.0], and the curve 94 represents the hole transport coefficients for the weights providing the minimum error. The curve 90 deviates from the ground truth closer to the injection than the other curves. The curve 94 deviates from the ground truth along the hole moving direction the furthest away from the injection location (voxel 70), indicating the increased range with accuracy provided by training with the enhancement of the weights for the weak signal relative to the strong signal. Without using the weighted loss function (i.e., curve 92), the deep learned physics-based model can only infer correctly the transport coefficient, which is the electric field E, from the movement of holes from voxel ~70 down to voxel ~55. When using the weights providing the minimum error (i.e., curve 94), the model correctly infers the transport properties using holes only signals from voxel ~70 down to voxel ~50, which corresponds to the theoretical value expected for the number of time steps calculated (no holes are expected to reach below voxel 50 due to the mobility of holes).

FIGS. 9B-E show the trapping coefficients for holes, the detrapping coefficients for holes, trapping coefficients for electrons, and detrapping coefficients for electrons, respectively. The ground truth and predicted coefficients for different weightings are represented, showing more optimum performance for the weightings provided by the minimum error.

The inference of trapping properties may be even more greatly influenced by the enhancement provided by the weighting for minimum error. The inference of detrapping properties may be even more greatly influenced by the enhancement provided by the weighting for minimum error. These improvements are provided without degrading electron and/or voltage related coefficients.

In act 78 of FIG. 7, the trained physics-based neural network is stored in a memory. The trained network has a network architecture representing the physics-based model and values for the learned parameters (weights) of the network. This information is stored so that the trained network may be used to predict or estimate the signals at the anode/cathode along with the free and trapped charges (electrons and holes) in the material, given an input location and charge. The trained network may be used for a specific detector, to predict signals and charges in a given detector.

In one simulation experiment, the detector material is considered to have uniform material properties. The model is trained by injecting unit electron-hole pairs at voxel positions 9; 19; 29; 39; 49; 59; 69; 79; 89 and 99 along 1 D voxels from 0-100. The gradients for each electron-hole pair injection are computed and the overall gradient update is performed based on the sum of these individual gradients. In the trained model, weights of the voxelized model represent electron and hole coefficients in each voxel. The holes and electrons drift towards left and right ends of the detector, which are the cathode and anode, respectively. Since the holes have lower mobility than the electrons, the number of voxels trained (towards the cathode) by the holes injected at particular location is less than that trained (towards the anode) by the electrons. The trained model is tested with electron-hole pair injections at voxel positions 15; 25; 35; 45; 55; 65; 75; 85 and 95. The mean MSE between the output of trained model and the ground truth data (signals, charge and charge trapped) for this sample test case is 0.0093. This indicates the learned model achieves good accuracy when presented with unknown injection points. For an actual detector, the material properties assigned to the network for training may be set or limited based on known measures from the actual detector. Alternatively, or additionally, measurements from the known detector are used in the training data so that the physics-based network is trained to generate material properties for that specific detector. This simulation and corresponding model use two-hole trapping centers and one electron trapping center in a 100 voxel 1D model. In other embodiments, a greater number of voxels, 2D distribution of voxels, 3D distribution of voxels, non-uniform material properties, different numbers of trapping centers, and/or nonuniform defects may be included.

Figure 10:
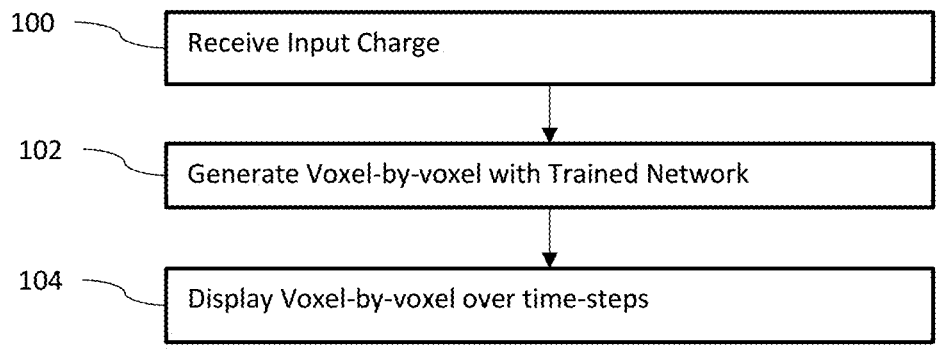
FIG. 10 is a flowchart diagram of one embodiment of a method for application of (inference by) a trained network modeling physical phenomena of a semiconductor material.

FIG. 10 is a flow chart diagram of one embodiment of a method for application of a trained network modeling physical phenomena of a semiconductor material. The physics-based model (e.g., machine trained neural network) trained as discussed for FIG. 7 is used to generate signals in the electrodes (anode and cathode) along with free and trapped charges in the material in each voxel, given an input charge and location.

The system of FIG. 6, a computer, server, or workstation performs the method of FIG. 10. Other systems may be used. Additional, different, or fewer acts may be provided. For example, the description is stored instead of being displayed. As another example, acts for using the description to simulate or model performance of a detector in detection or imaging for positron emission tomography, single photon emission tomography, Compton imaging, and/or x-ray imaging are provided.

In act 100, an input charge is received. The input represents interaction of an emission, such as a gamma ray emission from a radiopharmaceutical, with the detector. The energy and location of the input is designated.

Multiple input charge measurements may be received, such as representing a sequence of detected emissions. The voxel-by-voxel description of free and trapped charges (electrons and holes) along with signals generated in the anode and cathode is generated for each of the received input charge measurements in act 102.

In act 102, a processor generates a voxel-by-voxel description of free and trapped charges (electrons and holes) along with signals generated in the anode and cathode by applying the input charge measurement to the trained neural network. The trained neural network models holes, electrons and/or voltage voxel-by-voxel as the physical phenomena of the semiconductor material. The training used a weighted loss function using one or more weights for the holes, one or more weights for the electrons, and one or more weights for the voltage or signals. The weights for the holes were at least double the weights for the voltage or signals, such as being one, two, or three orders of magnitude larger. The weights for the electrons may be the same as or smaller than the weights for the holes. For example, the weights (e.g., k=0.1, l=100.0, and n=100.00) selected to minimize the error are used in the training. The weights for the holes and electrons are at least two orders of magnitude greater than the weight for the voltage.

In one embodiment, the trained physics-based network, in response to input of the charge and location, generates the voxel-by-voxel description of free and trapped charges (electrons and holes) along with signals generated in the anode and cathode. Additional (e.g., detrapping or recombination), fewer (e.g., no hole trapping), or different physical properties or signals may be modeled with this approach. The electron coefficients may have been weighted together or separately in the loss function. The hole coefficients may have been weighted together or separately in the loss function. By using the unequal weighting with greater weight values for weaker signals, the weights of the resulting machine-trained physics-based network is able to represent the voxel-by-voxel description for the holes and/or electrons over a greater range of voxels due to selected weights.

In act 104, a display screen displays at least a portion of the voxel-by-voxel description of free and trapped charges (electrons and holes) and/or signals generated in the anode and cathode in a graphical user interface. The processor extracts the properties of interest and displays them. Alternatively, the signals and charges can be stored or used for further imaging or simulation. The voxelized detector properties may be used to determine whether a given detector has sufficient quality for use in imaging.

Part 3:

The physics-based model or network described in Part 1, Part 2, or another such model may be improved. The training and learning-based physical models of the detector are trained with reduced data. The learning-based full model of the detector of Parts 1 and/or 2 uses a loss function taking into consideration the complete data as used by the classical physical equations—signals, voltage distribution in the material, and free and trapped charges in the different trapping centers for both electrons and holes. Each of these data is obtained from experimental hardware setups with the detector, which not only requires costly equipment, but also skilled manpower and time. To address this issue, the learning-based model learns from fewer data than in the full model, which is dictated by the physical model. The model is trained with fewer data than what is dictated by the classical physical equations, stepwise removing a small fraction of relevant data from the full learning-model (e.g., removing the charge trapped in one trapping center, followed by charges trapped in both trapping centers). A significant portion of the data may be removed from the full model. Only the signals or only the free charge may be used for training the physical model. The models are designed keeping in mind what can be measured with the hardware setups and labor required to generate these data.

Figure 11:
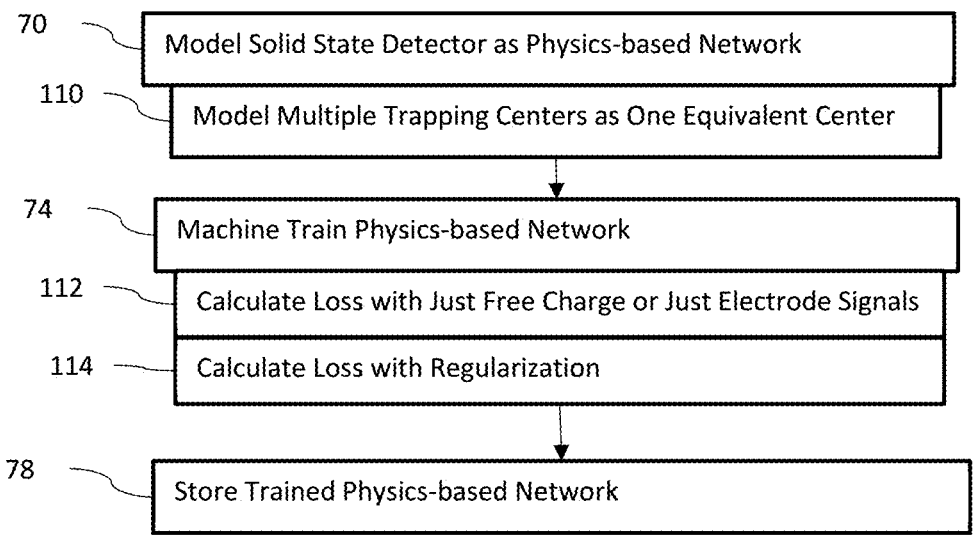
FIG. 11 is a flow chart diagram of one embodiment of a method for training a neural network modeling physical phenomena of semiconductor material with limited ground truth information.

FIG. 11 is a flow chart diagram of one embodiment of a method for training a neural network modeling physical phenomena of semiconductor material, such as machine training a charge transport network representing a solid-state detector or RTSD. The training incorporates a model with equivalency used for trapping centers, regularization in the loss function, and/or training with just electrode signals or just free charge.

The method is implemented by the system of FIG. 6 or a different system, such as a computer, server, or workstation and memory. Additional, different, or fewer acts may be provided. For example, act 114 is not performed, such as where the ground truth is based on just free charge. As another example, the trained physics-based neural network is applied instead or in addition to be stored in act 78.

Act 70 is performed as discussed above for FIG. 7. The network models the semiconductor material in voxels with electrodes on the semiconductor material. The electrodes are the anode and/or cathode electrodes at the ends or surface of the block of material (i.e., at the end voxels with multiple intervening voxels). Each voxel is represented in the neural network by a tensor field defined by (i) a location, i, of the voxel within the semiconductor material and (ii) one or more physics-based phenomena. For example, the physics-based phenomena include trapping of the holes, transport of the holes, recombination of the holes, trapping of the electrons, transport of the electrons, and recombination of the electrons.

The trapping and detrapping may be represented as multiple trapping centers, such as trapping centers at different bands or energies. Alternative embodiments of act 70 use equivalency, as provided in act 110. The physical-based model implemented by the network is altered to use a single equivalent trapping center instead of multiple trapping centers for different energies. The single equivalent trapping center models an equivalent defect representing multiple trapping centers corresponding to different energy levels per voxel. The machine training uses a model where the physics-based phenomena include an equivalent defect representing multiple trapping centers as a single trapping center. The semiconductor material may include multiple material defects corresponding to the multiple trapping centers. The multiple material defects correspond to different energy levels or bands. Defects of the solid-state detector are modeled, such as for each voxel, as a single equivalent trapping center. These multiple or all defects and corresponding trapping centers are modeled as one equivalent trapping center.

To reduce the dependency on any of the trapped hole and/or electron charges, which are used in the physical mode of Part 2, an equivalent trapping is used. This results in a model that characterizes the trapping centers in an equivalent manner. The equivalent trapping and detrapping lifetimes are the equivalent contribution of several trapping and detrapping lifetimes in the detector that contribute to the dynamics of charge motion in the detector. The properties of the physical detector can be attributed as defect-free properties in addition to equivalent defects in the material. The detector has inherent properties such as transport of charges (electrons and holes) in bulk of the material along with recombination of charges which form the defect free model. On the other hand, the defects (equivalent) in the model contribute due to trapping and detrapping of charges at the trapping centers within the detector. The presence of multiple trapping and detrapping levels can be converted to equivalent trapping and detrapping levels. In such a scenario, for 2-hole trapping levels of CZT with trapping lifetimes $\tau 1$ and $\tau 2$, the equivalent trapping lifetime is given as:

$$\frac{1}{\tau_{eq}} = \frac{1}{\tau_1} + \frac{1}{\tau_2} + \ldots$$

Considering the probability of trapping 1 level as $p_{\tau 1}$ and detrapping 1 lifetime as $\tau_{dt1}$, along with probability of trapping 2 level as $p_{\tau 2}$ and detrapping 2 lifetime as $\tau_{dt2}$, the equivalent detrapping lifetime is given as:

$$\frac{p_{\tau eq}}{\tau_{dteq}} = \frac{p_{\tau_1}}{\tau_{dt_1}} + \frac{p_{\tau_2}}{\tau_{dt_2}} + \ldots$$

Figure 12:
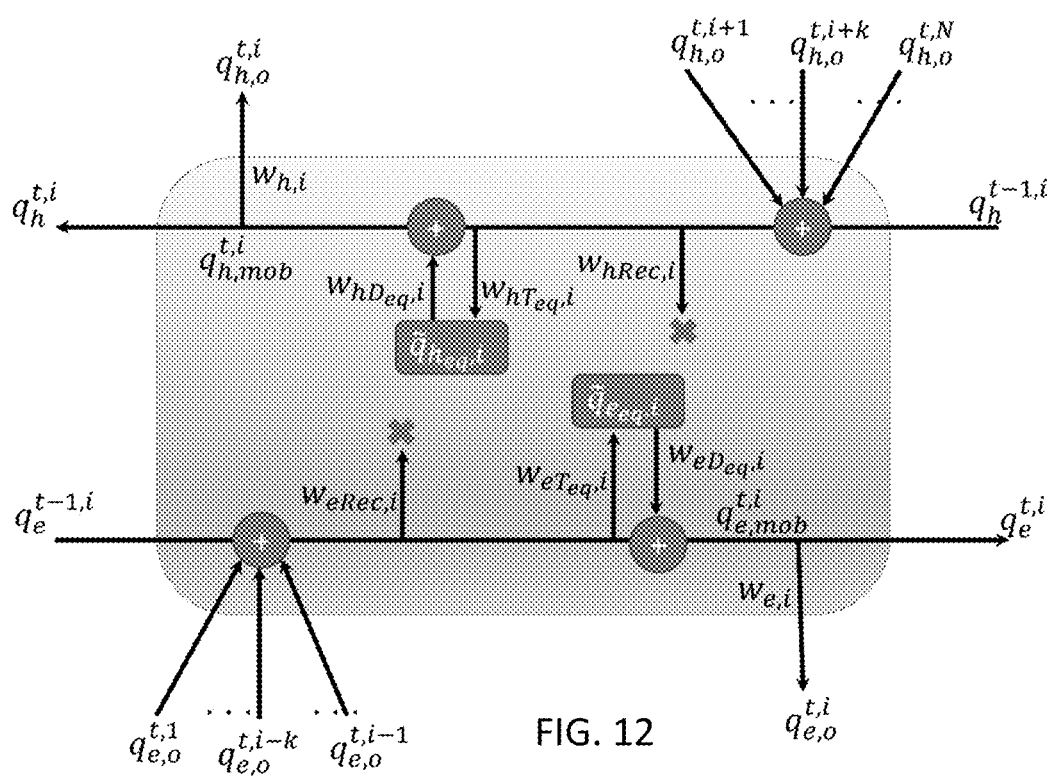
FIG. 12 illustrates a physical model using trapping center equivalency implemented as a neural network for one voxel.

The physical model is designed as a combination of defect-free model and a model with equivalent defects. The equivalent computations in a voxel i is shown in FIG. 12. The equivalent trapping and detrapping weights are $w_{hTeq,i}$ and $w_{hDeq,i}$ for holes, and, similarly for electrons, the corresponding trapping and detrapping weights are $w_{eTeq,i}$ and $w_{eDeq,i}$. For example, the equivalent defect is a first learnable weight of the network for equivalent electron trapping, a second learnable weight of the network for equivalent electron detrapping, a third learnable weight of the network for equivalent hole trapping, and a fourth learnable weight of the network for equivalent hole detrapping. The charges in the equivalent trap center are $\tilde{g}_{heq,i}$ and $\tilde{q}_{eeq,i}$ for holes and electrons, respectively.

The model of FIG. 12 also shows charge to and from adjacent voxels i, i+1, i+k, through N' for both holes and electrons as well as recombination (Rec) for both holes and electrons. The neural network includes learnable parameters or weights for recombination ($w_{Rec}$), holes and electrons to adjacent voxel I ($w_{h/e,i}$), and the weights for the equivalent trapping center. Additional learnable parameters or weights may be used.

Referring again to FIG. 11, the physics-based network is machine trained in act 74 as discussed above for FIG. 7. Training data is used to machine train. The training data includes samples of injected charges into the semiconductor material at one or more voxels and corresponding or linked ground truth results.

For the embodiments of part 3, the ground truth is the signals measured at the electrodes or the free charges measured at the voxels. Only electrode signals or only free charges are used as ground truth in the loss for machine training as shown in act 112. A loss is calculated as part of the machine training, and the loss uses just electrode signals or just free charges as the ground truth (i.e., only ground truth in the machine training of the network). Through optimization based on loss between the ground truth and the estimates of the network being trained, the values of the learnable parameters (e.g., weights of the model) are learned. The physics-based network is machine trained.

Where an equivalent trapping center is used for a given voxel, the machine training learns the values for the learnable parameters of the single equivalent trapping center. For example, the values of a first learnable weight of the network for equivalent electron trapping ($w_{eTeq}$), a second learnable weight of the network for equivalent electron detrapping ($w_{eDeq}$), a third learnable weight of the network for equivalent hole trapping ($w_{hTeq}$), and a fourth learnable weight of the network for equivalent hole detrapping ($w_{hDeq}$) are learned.

In act 114, the loss calculation includes regularization. For example, the training uses just the electrode signals as the ground truth. One or more regularization terms are included in the loss function. The electrode signals are voltages, current, or charge at the cathode(s) and/or anode(s). For example, electron signals (e.g., voltage or current) at the cathode and hole signals (e.g., voltage or current) at the anode are measured and used as the ground truth. The signals from the various or different electrodes are used for ground truth to compare with estimates from the network. Only the signals generated at the cathode and anodes due to motion of the charged particles are used to train.

Typically, the signals are generated at the electrodes by the superposition of signals generated individually due to transport of electrons and transport of holes. The signals generated due to the transport of electrons may be separated from the signals generated due to the transport of holes. In one embodiment, the electron and hole signals are separated and used in training the model. An example loss function for training the physical model is given as:

$$\text{Loss}_{RM4}[(sg_{e,gt}-sg_{e,L})^2]+[(sg_{h,gt}-sg_{h,L})^2]$$

where RM4 designates the loss as model 4 and sg is the electrode signal (e.g., $sg_{e,gt}$ is the electron signal as the ground truth). Other loss functions may be used, such as with regularization, filtering, or normalization. In another embodiment, the electron and hole information are combined (e.g., sum) and the loss is based on the combination. In yet another embodiment, separate square terms are provided for each cathode where multiple cathodes are provided. Alternatively, the electron signals at the multiple cathodes are combined (e.g., summed) and the combination is used as the ground truth.

In one embodiment, one or more regularization terms are included in the loss function. For example, regularizations are provided for both the difference in electrode signals and the difference in the hole signals. The regularizations may be weighted, allowing programmable setting of the influence of the different regularizations, such as weighting as discussed above for Part 2. In one embodiment, the weight for the electron regularization is greater than the weight for the hole regularization by a factor of 5 or more (e.g., 0.1 to 0.01).

Various regularizations may be used. For example, L1, L2, total variation, support vector, or Gaussian process regularization is used.

Using the loss function for only signals without regularization may result in weights of the model that fail to converge on the ground truth solution. The solution converges to a local minimum different from the global minimum, and hence the trained weights differ from the ground truth weights. Using regularization avoids the incorrect solution. For example, a total variation (T.V.) regularization is provided on the different weights of the model corresponding to the trapping, detrapping, and recombination of electrons and holes to converge the learned solution to the global minimum solution. Where equivalent trapping is used (see FIG. 12), the multiple trapping and detrapping hole coefficients in actual material is learned as a single equivalent trapping and detrapping coefficient. The loss function is modified to include the T.V. regularization. The T.V. regularization ensures smoothness in the learned weights of the model. An example loss function with T.V. regularization is given as:

$$Loss_{RM4}[(sg_{e,gt}-sg_{e,L})^2]+\lambda_1\|\nabla w_{eTeq}+\nabla w_{eDeq}+\nabla w_{eRec}\|_2+[(sg_{h,gt}-sg_{h,L})^2]+\lambda_2\|\nabla w_{hTeq}+\nabla w_{hDeq}+\nabla w_{hRec}\|_2,$$

where LossRM4 is the loss, $sg_{e,gt}$ is the electrode signal as ground truth, $sg_{e,L}$ is an estimated electrode signal of the network, $w_{eTeq}$ is a learnable weight of the network for electron trapping, $w_{eDeq}$ is a learnable weight of the network for electron detrapping, $w_{eRec}$ is a learnable weight of the network for electron recombination, $sg_{h,gt}$ is the hole signal as ground truth, $sg_{h,L}$ is an estimated hole signal of the network, $w_{hTeq}$ is a learnable weight of the network for hole trapping, $w_{hDeq}$ is a learnable weight of the network for hole detrapping, $w_{hRec}$ is a learnable weight of the network for hold recombination, and $\lambda_1$ and $\lambda_2$ are weights in the loss function for the total variation regularization implemented by the terms $\|\nabla w_{eTeq}+\nabla w_{eDeq}+\nabla w_{eRec}\|_2$ and $\|\nabla w_{hTeq}+\nabla w_{hDeq}+\nabla w_{hRec}\|_2$ Other regularization and/or loss functions may be used.

The optimal values of λ1 and λ2 are determined through simulation experiments by finding the minimum error between the ground truth weights and the trained weights. Any value may be used, such as $\lambda_1, \lambda_2=[0.0001, 0.001, 0.01, 0.1, 0, 1.0, 10.0, 100.0, 1000.0]$. In one embodiment, $\lambda_1$ is 0.1 and $\lambda_2$ is 0.01. The weights may be equal.

Returning to act 112, the loss for the machine training of act 74 may use a difference between estimated and ground truth free charges. Just the free charge is provided as ground truth. The free charge may be of the electrons, holes, or both electrons and holes. For example, the loss function for calculating the loss includes free electron and free hole charges for each of the voxels and does not include trapping, recombination, and electrode signals. The free charge may be measured using Pockel's Cell Imaging Techniques along with Internal Electric Field and Charge Collection Efficiency.

The loss function for this model may use only the free electron and hole charges as ground truth to train the model. An example loss function using only free charge is given as:

$$Loss=l[(q_{e,gt}-q_{e,L})^2]+n[(q_{h,gt}-q_{h,L})^2],$$

where q is free charge, e designates electron, h designates hole, l is a weight, n is a weight, gt designates the ground truth, and L designates the estimate of the network. Other loss functions may be used, such as without one or more of the weights or with regularization. Any of various loss functions may be used. Regularization, normalization, and/or filtering may be included.

The difference in estimated and ground truth for electrons is handled separately from holes. Two terms, difference for holes and difference for electron charge, are included in the loss function. These two terms may be weighted separately. The weights l and n of the loss function may have any value, such as being equal. In one embodiment, the weights discussed above for part 2 are used, where the hole signal is considered a weaker signal than the electron signal. In another embodiment, the weight, l, for the free electron charges is larger than the weight, n, of the free hole charges by a factor of 5, such as l=10 and n=1.

In act 78, the machine-learned physics-based network is stored. The network as trained is stored for testing, application, and/or distribution or copying for application at different facilities. For example, the trained network is used by a manufacturer of detectors or a manufacturer of PET or SPECT systems to determine whether to use a given detector and/or to calculate voxel-by-voxel corrections to signals for a detector being used. The networks are stored and/or used as discussed above for FIG. 7.

A detector has known charges applied to known locations. The signals at the electrodes and/or the free charges in the voxels are measured. This data may be used as ground truth to train a network. The resulting values of the learned variables of this physics-based network then provide characteristics of the detector and/or the various charges (e.g., free, trapped, and recombination) for holes and electrons as well electrode signals given a new charge input. The learned variables can also be used to identify anomalies in the detector properties spatially and temporally, which thereby helps in utilizing the defective detector.

In one embodiment, the learning-based physical model of RTSD of FIG. 12 is trained with reduced data (i.e., just free charge or just electrode signal in the loss function for ground truth difference). To test performance, synthetic data is used in the training. The synthetic data is created by considering the classical model in MATLAB. In these learning-based physical models, the input to the model are the injection positions and magnitude of the generated electron-hole pair charges. The magnitude of the injected charges is normalized to 1. The outputs from the model are the free and trapped charges in the voxels, along with the signals at the electrodes. The complete data as dictated by the physical equations for the RTSD is first generated using all the known phenomena such as drift, trapping, detrapping, and recombination of electrons and holes. Subsequently, limited data is chosen out of these complete data to train the learning-based models with complete physical properties for multiple trapping centers or a single equivalent trapping center, depending on the data.

The model weights are initialized during the start of the training process. The models are trained over several epochs by computing the loss function based on the output corresponding to each input injection for the different reduced models. The model is a recurrent network structure over time, and hence Backpropagation through Time (BPTT) is used to compute the gradients of the loss with respect to the trainable weights in the model. The weights are updated based on a stochastic gradient descent method—ADAM optimization. The learning rate of 5×10−4 is used along with 2 momentum terms set as β1=0.9 and β2=0.999. The optimization reduces the loss function over epochs, and the weights are trained. Once the model is trained, the weights of the model converges to the ground truth detector parameters used to generate the data in MATLAB. The model is developed using the machine learning Tensorflow library in Python in eager execution mode.

The trained coefficients for the different Physical Models is evaluated by computing an error metric for each of the coefficients. For example, for electron trapping coefficients ($w_{eT}$) with $w_{eT,gt}$ and $w_{eT,lr}$ as the ground truth and learned coefficients, the error is expressed as:

$$Err(w_{eT}) = \sqrt{\frac{1}{N_{fin} - N_{inj} + 1} \sum_{i=N_{inj}}^{N_{fin}} \left\{ \frac{w_{eT,lr,i} - w_{eT,gt,i}}{w_{eT,gt,i}} \right\}^2}.$$

The error is computed over the injection positions of the electrons/holes and the number of voxels over which the coefficients are trained over the epochs. The difference between the learned coefficients and ground truth coefficients for the trained region is normalized by the ground truth coefficients to account for the different ranges of weights in the model and put equal emphasis on the different model weights. For multiple injections of electron-hole pairs, when the model coefficients are not trained in a contiguous manner, only the voxels where the coefficients are trained are taken into account in order to compute this error metric. For characterization purposes, more emphasis is placed on the RTSD properties in the bulk of the material than at the ends. The mean error (Err(Mean)) is computed as the arithmetic mean of these individual coefficients. The relative error, express as:

$$Err2(w_{eT}) = \frac{1}{N_{fin} - N_{inj} + 1} \sum_{i=N_{inj}}^{N_{fin}} \left| \frac{w_{eT,lr,i} - w_{eT,gt,i}}{w_{eT,gt,i}} \right| \times 100$$

for each of the trained coefficients, is also shown for electrons and holes. For electron and hole coefficients, the mean of the different electron and hole coefficients are computed as the relative error metric.

Figure 13:
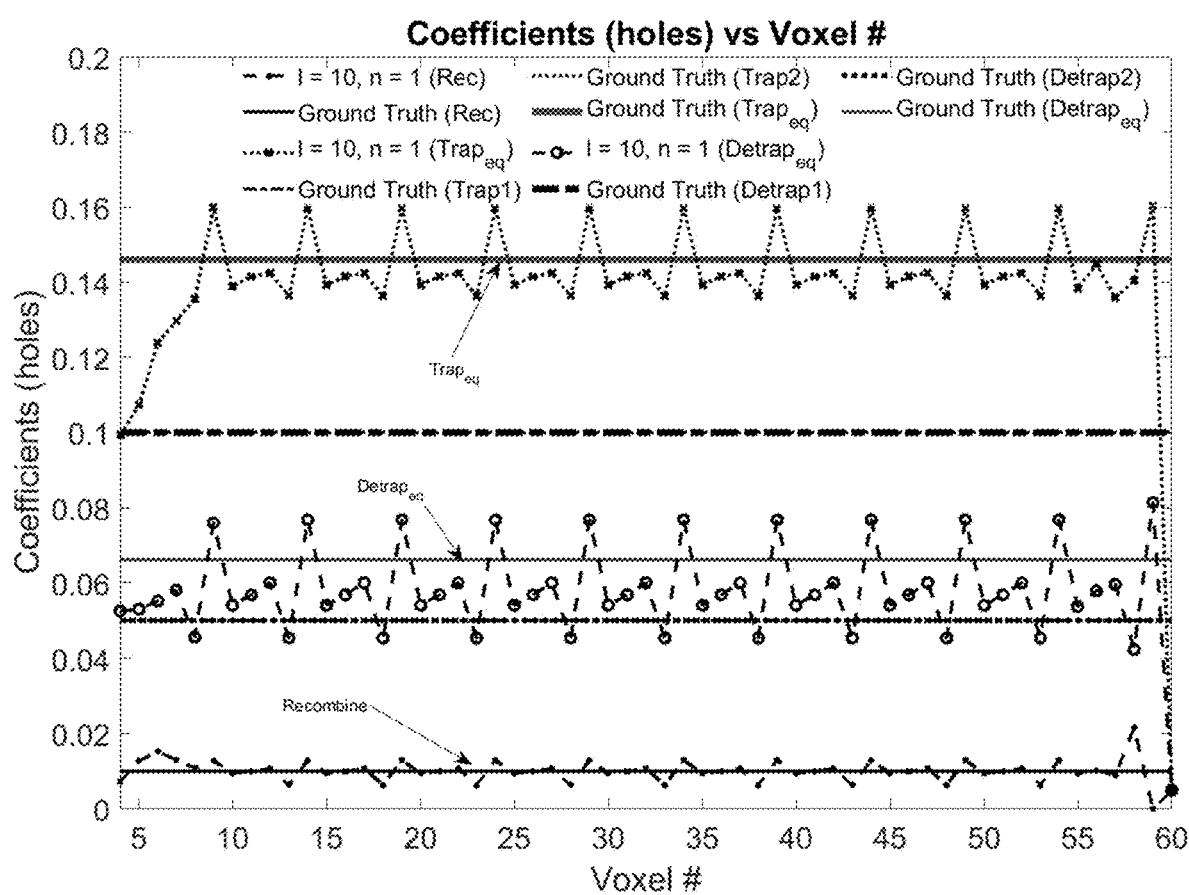
FIG. 13 is a graph representing hole coefficients by voxel using equivalency as compared to values for different energy levels.

For the model using just the free charge as the ground truth for the loss, the equivalent coefficients are used for the trapping centers in the model. This free charge-trained model is tested. FIG. 13 shows hole coefficients (learned physical properties) of the model over 60 voxels. The ground truth and estimated (l=10, n=1) for recombination (Rec), trapping (for two trap centers (trap 1 and trap 2) and the equivalent ($trap_{eq}$)), and detrapping (for two detrap centers (detrap 1 and detrap 2) and the equivalent ($detrap_{eq}$)) are shown. The electron-hole charge pairs are injected at voxel positions 9 with stride of 5 voxels until voxel 59 during training the physical model. The weights in the loss function are: l=10 and n=1. The electron drift, trapping, detrapping and recombination coefficients follow the ground truth values. The learned recombination coefficients for the holes follow the ground truth values as well. For multiple trapping centers for holes (2 in this case), the learning-based model finds the equivalent trapping center, with equivalent trapping and detrapping lifetimes.

The ground truth value of trapping 1 lifetime is 0.195 µs and trapping 2 lifetime is 0.094 µs. This corresponds to the probability of trapping holes in trap center 1 and 2 to be 0.05 and 0.10, respectively. The ground truth equivalent trapping lifetime ($\tau_{eq}$) is calculated to be 0.063 µs. The fraction of holes remaining as free holes after getting trapped in the equivalent trapping center is $N_{after} = N_{before} e^{-dt/\tau_{eq}}$. Considering time step dt=10 ns, $N_{after}$=0.8541 $N_{before}$. Thus, the fraction of holes getting trapped in the equivalent trapping center is 1−0.8541=0.1459. Similarly, in the ground truth simulation data, the fraction of charge getting detrapped from trap centers 1 and 2 is considered as 0.10 and 0.05, respectively. Thus, after detrapping, the fraction of charges remaining in trapping center 1 and 2 would be 0.90 and 0.95, respectively. Considering $N_{after} = N_{before} e^{-dt/\tau_{eq}}$, with the same time step of dt=10 ns, the detrapping 1 and 2 lifetimes are 94.9122 ns and 194.9573 ns, respectively. Considering the equivalent trapping probability as 0.1459, the equivalent detrapping lifetime $\tau_{dt,eq}$ is computed as 145.9 ns. The fraction of holes remaining after detrapping from the equivalent trapping level would be 0.9338. Thus, the fraction of charges getting detrapped from the equivalent trapping center is 1−0.9338=0.0662. From simulation experiments, the learning-based model is able to correctly identify the equivalent trapping and detrapping probabilities. For the learned coefficients, the error values of drift coefficients ($\mu_e$), trapping ($w_{eT}$), detrapping ($w_{eD}$), and recombination coefficients ($w_{eRec}$) for electrons are 1.32×10$^{-5}$, 0.0412, 0.0316, and 0.0277, respectively, which are computed for voxels 9 to 99. Similarly, the error values of the equivalent trapping ($w_{hT,eq}$), equivalent detrapping ($w_{hD,eq}$), and recombination coefficients ($w_{hRec}$) for holes are 0.0954, 0.1957 and 0.3378, respectively, which are computed for voxels 1 to 59. The arithmetic mean of the error of these material properties is 0.1042.

The error is determined for the physical model trained using just electrode signals for ground truth with regularization in the loss function. The physical model is trained with signals generated from motion due to electrons and holes separately. The trained hole coefficients and electrons coefficients converge. For holes, the physical model finds out the equivalent trapping and detrapping coefficients similar to the free charge trained model. During training, the trapping hole and detrapping hole weights are bounded in [0.04, 0.07], and [0.15, 0.30], respectively, which are close to the actual ground truth weights. The initialization of trapping, detrapping and recombination coefficients for holes are done uniformly at 0.05, 0.2, and 0.005, respectively. This is represented as 'bound' in Table 2 below. For λ2=0, without total variation (T.V.) regularization, the hole trapping, detrapping and recombination coefficients do not converge to the ground truth hole coefficients. On the other hand, using the T.V. regularization improves the convergence of these coefficients to actual ground truth values. The different error values, computed for hole coefficients from Voxels 13 to 30 for varying λ2 values are shown in Table 1 below. For λ2=0.001 and 0.01, the hole trapping and detrapping coefficients are closer to the ground truth coefficients than for λ2=0.1 and hence have smaller error. However, for recombination coefficients, the learned coefficients for λ2=0.1, 0.01, and 0.001 are better than for λ2=0. Thus, it is seen that the weights λ2=0.01, 0.001 in the loss function provides better convergence for the hole coefficients.

TABLE 1

| $\lambda_2$ | Err($w_{hT,eq}$) | Err($w_{hD,eq}$) | Err($w_{hRec}$) | Err(Mean) |
|---|---|---|---|---|
| 0 | 0.3347 | 0.1139 | 0.7515 | 0.4000 |
| 0.001 | 0.0967 | 0.0672 | 0.0427 | 0.0689 |
| 0.01 | 0.1072 | 0.0727 | 0.0108 | 0.0636 |
| 0.1 | 0.1719 | 0.1419 | 0.0175 | 0.1104 |

In Table 1, the error values are shown for the signal only-ground truth physical model with different $\lambda 2$ values. Err($w_{hT,eq}$), Err($w_{hD,eq}$) and Err($w_{hRec}$) are the error values in the trapping equivalent, detrapping equivalent, and recombination coefficients of the holes respectively. Err (Mean) is the arithmetic mean each of these error values. Hole injections are at voxel 24, 27 and 30.

TABLE 2

| $\lambda_2$ | condition | Err($w_{hT,eq}$) | Err($w_{hD,eq}$) | Err($w_{hRec}$) | Err(Mean) |
|---|---|---|---|---|---|
| 0.001 | bound | 0.0842 | 0.0548 | 0.0326 | 0.0572 |
| 0.001 | far | 0.1512 | 0.1375 | 0.0807 | 0.1231 |
| 0.001 | ip1 | 0.0994 | 0.0628 | 0.0189 | 0.0604 |
| 0.001 | ip2 | 0.0549 | 0.0206 | 0.0278 | 0.0115 |
| 0.01 | bound | 0.1118 | 0.0734 | 0.0161 | 0.0671 |
| 0.01 | far | 0.1884 | 0.1591 | 0.0089 | 0.1188 |
| 0.01 | ip1 | 0.1154 | 0.0809 | 0.0098 | 0.0687 |
| 0.01 | ip2 | 0.0341 | 0.0332 | 0.0103 | 0.0259 |

In Table 2, the error values for the physical model are shown for $\lambda 2=0.001$ and 0.01 values. Err($w_{hT,eq}$), Err($w_{hD,eq}$), and Err($w_{hRec}$) are the error values in the trapping equivalent, detrapping equivalent, and recombination coefficients of the holes, respectively. Err(Mean) is the arithmetic mean each of these error values. Hole injections are at voxel 24, 26 and 28.

Additional simulation experiments use $\lambda 2=\{0.001,0.01\}$ without bounds on trapping and detrapping coefficients and electron-hole pair injections at Voxels 24, 26 and 28. All the initial weights of trapping and detrapping over the voxels are uniformly initialized as $\{0.005,0.005\}$, $\{0.05,0.2\}$, $\{0.07, 0.3\}$, which corresponds to 'far', 'ip1' and 'ip2'. Table 2 shows the different error values, computed for hole coefficients from Voxels 13 to 28. Bounds on the trapping and detrapping weights do not have any influence on the final trained weights of the holes. For $\lambda 2=0.001$, the hole trapping, detrapping, and recombination coefficients converge more closely to the ground truth parameters. Additionally, initializing the trapping and detrapping hole weights with 'ip2' converges the trained weights closer to the actual ground truth parameters, which signifies better convergence of the solution to ground truth parameters with weights initialized above the ground truth parameters.

$\lambda 1$ is varied with $\lambda 1 \in \{0, 0.001, 0.01, 0.1\}$. The electron-hole pair injections are at Voxels 81, 84 and 87. For $\lambda 1=0.1$, the mean error value has the minimum value of 0.0638. During training, the bounds on trapping, detrapping and recombination weights for electrons are bounded in [0.004, 0.012], [0.008,0.02] and [0.0005,0.005], respectively, while the initialization of trapping, detrapping and recombination coefficients for electrons are done uniformly at 0.012, 0.015 and 0.002 respectively. Additional simulation experiments have $\lambda 1=0.1$ without bounds on trapping, detrapping and recombination coefficients with the same electron-hole pair injections at Voxels 81, 84 and 87. The initialization of trapping, detrapping, and recombination weights for electrons are done with the same values of $\{0.012, 0.015, 0.002\}$, $\{0.02, 0.02, 0.004\}$, and $\{0.005, 0.009, 0.0005\}$, which are referred as 'same', 'grtr' and 'lt', respectively. For 'grtr' case, the mean error has the value of 0.1159, which is minimum of these three cases. Overall, the case with 'bound' provides the minimum error for the electron coefficients. The material properties for the electrons converges very closely to the corresponding ground truth values.

Figure 14:
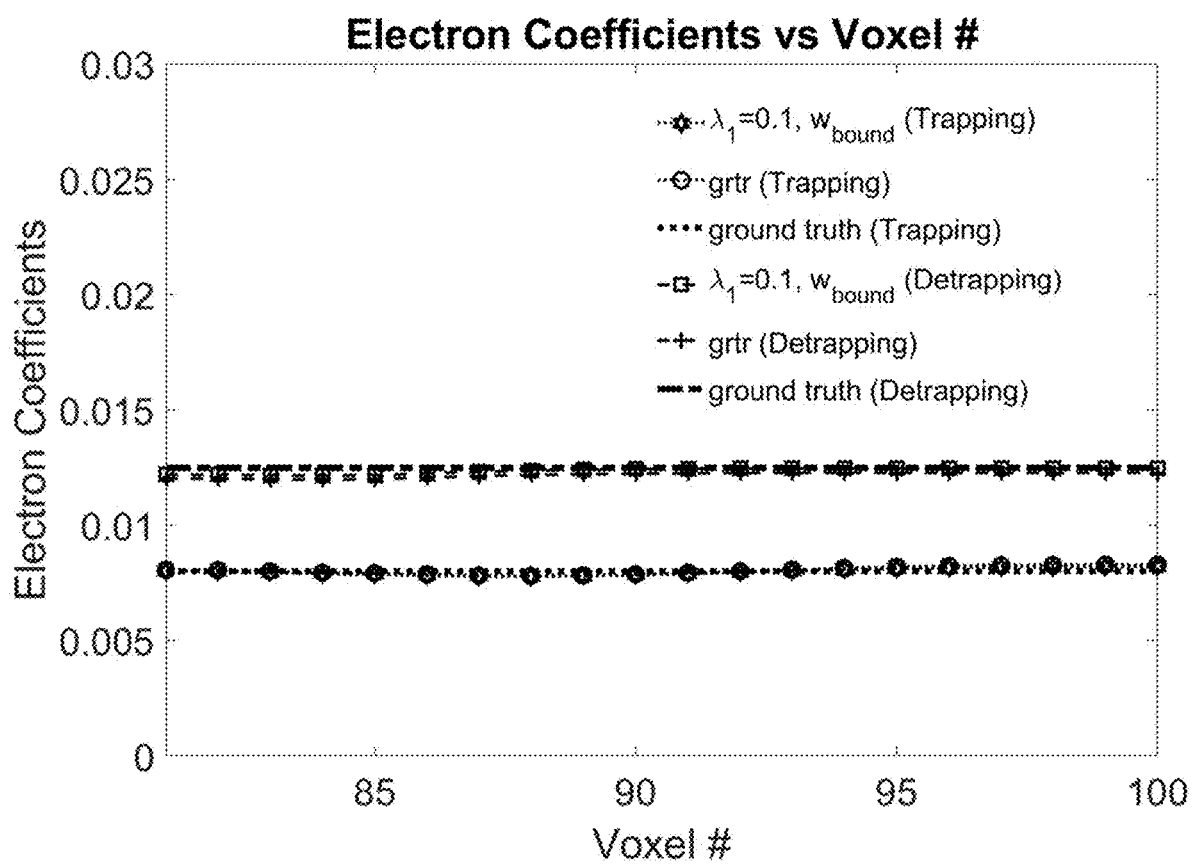
FIG. 14 is a graph representing electron coefficients using just electrode signals as the ground truth.

FIG. 14 shows example electron coefficients for the electrode signal-based ground truth model with electron injection at voxels 81, 84, and 87. The estimated electron coefficients are provided for $\lambda 1=0.1$ and the 'grtr' versions, while the ground truth is shown for comparison. Both trapping and detrapping are shown. The estimated matches well with the ground truth.

The performance of the different physical models is evaluated with the relative error in %, as shown in Table 3. Table 3 shows Err2 for four models. Model 1 is the model from part 1. Model 2 is the model from part 2. Model 3 is the free charge only ground truth physical model, and model 4 is the electrode signal only ground truth physical mode.

TABLE 3

| Physical Model | Err2(electrons) | Err2(holes) | Err2(Total) |
|---|---|---|---|
| 1 | 2.4104 | 2.9942 | 2.7023 |
| 2 | 2.6536 | 3.6098 | 3.1317 |
| 3 | 1.3443 | 16.0488 | 8.6966 |
| 4 (holes only) | × | 3.2256 | 4.1909 |
| 4 (electrons only) | 5.1561 | × | |

The mean relative error due to the electron coefficients (Err2(electrons)) are separated from that of holes (Err2(holes)), and the mean of Err2(electrons) and Err2(holes) are then computed as Err2(Total) in Table 3. For Physical Model-1, k=1, l=104, n=103 are used with electron-hole pair injections at voxel position 9 with stride of 5 voxels until voxel 59. For Physical Model-2, l=10, n=1 is used, with the same electron-hole pair injections as in Physical Model-1. For Physical Model-3, l=10, n=1 and the electron-hole pair injections are in the same voxel position as in Physical Model-1 and 2. In the electrode signal only ground truth physical model (Physical Model-4), the electrons and holes coefficients are trained separately. Hence, the Err2(electrons) only refers to the relative error result for the model trained for electron coefficients only. The electron injections are at voxel 81, 84, and 87 with $\lambda 1=0.1$ with 'bound' condition. On the other hand, Err2(holes) only refer to the relative error result for the model trained for hole coefficients only. The hole injections are at voxel 24, 26, and 28 with $\lambda 1=0.001$ with 'ip2' condition. For the free charge ground truth physical model (model-3), the Err2(holes) are maximum. This is because in the learned model, the hole coefficients (equivalent in this case) tend to oscillate around the ground truth value. Overall, the Err2(Total) is less than 9%, which shows good convergence of the RTSD material parameters to the ground truth values.

In results with Physical Model-3, slight fluctuations in the trained parameters around the converged value may occur. These fluctuations gradually diminish with continued training over several additional epochs. Additionally, in Physical Model-4, the addition of T.V. regularization to the loss function improves the solution drastically and converges the hole and electron coefficients to the ground truth parameters. For Physical Model-4, different weights on the T.V. regularization for electrons compared to the holes helps training.

The detector is modeled as one-dimensional. Two or three-dimensional voxel distribution may be modeled. The two and three-dimensional learning model of the detector follows the same principles.

In the embodiment used for testing to provide the results of Tables 1-3, the ground truth data is simulated using a classical model in MATLAB. In actual practice, the simulation results are validated with actual experimental data. This experimental data can be obtained using thermoelectric emission spectroscopy, thermally stimulated current measurements, laser induced techniques, and others. Using just the free charge or just the electrode signals for the ground truth reduces the burden on generating experimental data and can still characterize the RTSD at higher resolution (in order of microns).

The physical or physics models trained using just free charge or just electrode signal as the ground truth are applied as discussed above for FIG. 10. In this example, FIG. 10 shows one embodiment of a method for application of a trained neural network modeling physical phenomena of a semiconductor material where the trained neural network used the loss functions with limited ground truth.

In act 100, an input charge is received. The simulated charge or charge measurement and corresponding voxel for interaction are input. In act 102, a voxel-by-voxel description of free and trapped charges is generated by the trained neural network. The trained neural network models multiple trapping centers as an equivalent trapping center and was trained with ground truth of just free charges or just electrode signals as the ground truth for difference from estimated in the loss function. In act 104, at least a portion of the voxel-by-voxel description is displayed in a graphical user interface. Physics-based coefficients output by the neural network are or can be translated to real physical quantities. These physical quantities can be interpreted by a human as real material parameters important in the characterization of semiconductor materials, including sensors. The voxel-by-voxel description is the numerical values of the material properties and/or physics-based coefficients at each voxel.

FIG. 6 provides an example of a parallel processing memory architecture 600 that may be utilized to train or execute any of the physics-based networks discussed above. This architecture 600 may use NVIDIA™ CUDA (or a similar parallel computing platform). The architecture includes a host computing unit ("host") 605 and a GPU device ("device") 610 connected via a bus 615 (e.g., a PCIe bus). The host 605 includes the central processing unit, or "CPU" (not shown in FIG. 6) and host memory 625 accessible to the CPU. The device 610 includes the graphics processing unit (GPU) and its associated memory 620, referred to herein as device memory. The device memory 620 may include various types of memory, each optimized for different memory usages. For example, in some embodiments, the device memory includes global memory, constant memory, and texture memory.

Parallel portions of the training algorithms may be executed on the architecture 600 as "device kernels" or simply "kernels." A kernel comprises parameterized code configured to perform a particular function. The parallel computing platform is configured to execute these kernels in an optimal manner across the architecture 600 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the architecture 600 of FIG. 6 (or similar architectures) may be used to parallelize training tasks. For example, in some embodiments, processing of different nodes of the physics-based neural network.

The device 610 includes one or more thread blocks 630 which represent the computation unit of the device 610. The term thread block refers to a group of threads that can cooperate via shared memory and synchronize their execution to coordinate memory accesses. For example, in FIG. 6, threads 640, 645 and 650 operate in thread block 630 and access shared memory 635. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 6, the thread blocks 630 are organized in a two-dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the algorithms discussed herein may be partitioned over thread blocks automatically by the parallel computing platform software. However, in other embodiments, the individual thread blocks can be selected and configured by the user to optimize training of the physics-based neural network.

Continuing with reference to FIG. 6, registers 655, 660, and 665 represent the fast memory available to thread block 630. Each register is only accessible by a single thread. Thus, for example, register 655 may only be accessed by thread 640. Conversely, shared memory is allocated per thread block, so all threads in the block have access to the same shared memory. Thus, shared memory 635 is designed to be accessed, in parallel, by each thread 640, 645 and 650 in thread block 630. Threads can access data in shared memory 635 loaded from device memory 620 by other threads within the same thread block (e.g., thread block 630). The device memory 620 is accessed by all blocks of the grid and may be implemented using, for example, Dynamic Random-Access Memory (DRAM).

Each thread can have one or more levels of memory access. For example, in the architecture 600 of FIG. 6, each thread may have three levels of memory access. First, each thread 640, 645, 650, can read and write to its corresponding registers 655, 660, and 665. Registers provide the fastest memory access to threads because there are no synchronization issues, and the register is generally located close to a multiprocessor executing the thread. Second, each thread 640, 645, 650 in thread block 630, may read and write data to the shared memory 635 corresponding to that block 630. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 610 to read and/or write to the device memory 620. Device memory 620 requires the longest time to access because access must be synchronized across the thread blocks operating on the device. Thus, in some embodiments, the processing of each node of the physics-based neural network is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 6, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions a computing system's processor to generate signals representing the GUI display images. The processor, under control of an executable procedure or executable application, manipulates the GUI display images in response to signals received from the input devices. In this way, the user may interact with display images using the input devices, enabling user interaction with the processor or other device.

As used herein, the term "module" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A method of training a neural network to estimate physical characteristics of semiconductor material, the method comprising:

machine training, by a processor, the neural network, wherein the neural network models the semiconductor material in voxels with electrodes on the semiconductor material, where each voxel is represented in the neural network by a tensor field defined by (i) a location of the voxel within the semiconductor material and (ii) one or more physics-based phenomena;

calculating, by the processor, a loss as part of the machine training, the loss being a difference from just electrode signals or just free charges, wherein calculating the loss comprises calculating with the electrode signals or the free charges as the only ground truth in the machine training of the neural network; and storing the neural network as machine trained in a memory.

2. The method of claim 1 wherein calculating the loss comprises calculating the loss with just the electrode signals, a loss function for calculating the loss including a first regularization term.

3. The method of claim 2 wherein calculating the loss comprises calculation of the loss with just electron signals and hole signals at different electrodes, the loss function including the first regularization term for the electrode signals and a second regularization term for the hole signals.

4. The method of claim 3 wherein calculating the loss comprises calculating where the loss function includes first and second weights for the first and second regularization terms, respectively, the first weight larger than the second weight by a factor of five or more.

5. The method of claim 2 wherein calculating the loss comprises calculating with the first regularization term comprising a total variation regularization.

6. The method of claim 5 wherein calculating the loss comprises calculating where the loss function comprises:

$$\text{Loss}_{RM4} = [(sg_{e,gt} - sg_{e,L})^2] + \lambda_1 \|\nabla w_{eTeq} + \nabla w_{eDeq} + \nabla w_{eRec}\|_2 + [(sg_{h,gt} - sg_{h,L})^2] + \lambda_2 \|\nabla w_{hTeq} + \nabla w_{hDeq} + \nabla w_{hRec}\|_2,$$

where $\text{Loss}_{RM4}$ is the loss, $sg_{e,gt}$ is the electrode signal as ground truth, $sg_{e,L}$ is an estimated electrode signal of the neural network, $w_{eTeq}$ is a learnable weight of the neural network for electron trapping, $w_{eDeq}$ is a learnable weight of the neural network for electron detrapping, $w_{eRec}$ is a learnable weight of the neural network for electron recombination, $sg_{h,gt}$ is the hole signal as ground truth, $sg_{h,L}$ is an estimated hole signal of the neural network, $w_{hTeq}$ is a learnable weight of the neural network for hole trapping, $w_{hDeq}$ is a learnable weight of the neural network for hole detrapping, $w_{hRec}$ is a learnable weight of the neural network for hold recombination, $\lambda_1$ and $\lambda_2$ are weights in the loss function for the total variation regularization implemented by the terms $\|\nabla w_{eTeq}+\nabla w_{eDeq}+\nabla w_{eRec}\|_2$ and $\|\nabla w_{hTeq}+\nabla w_{hDeq}+\nabla w_{hRec}\|_2$.

7. A method of training a neural network to estimate physical characteristics of semiconductor material, the method comprising:
 machine training, by a processor, the neural network, wherein the neural network models the semiconductor material in voxels with electrodes on the semiconductor material, where each voxel is represented in the neural network by a tensor field defined by (i) a location of the voxel within the semiconductor material and (ii) one or more physics-based phenomena;
 calculating, by the processor, a loss as part of the machine training, the loss being a difference from just electrode signals or just free charges; and
 storing the neural network as machine trained in a memory;
 wherein machine training comprises machine training where the one or more physics-based phenomena include an equivalent defect representing multiple trapping centers as a single trapping center.

8. The method of claim 7 wherein the equivalent defect comprises a first learnable weight of the neural network for equivalent electron trapping, a second learnable weight of the neural network for equivalent electron deptrapping, a third learnable weight of the neural network for equivalent hole trapping, and a fourth learnable weight of the neural network for equivalent hole deptrapping.

9. The method of claim 7 wherein the semiconductor material includes multiple material defects corresponding to the multiple trapping centers, the multiple material defects corresponding to different energy levels.

10. The method of claim 1 wherein calculating the loss comprises calculating the loss with just the free charges, a loss function for calculating the loss including free electron and free hole charges for each of the voxels.

11. The method of claim 10 wherein calculating the loss comprises calculating with the loss function including a first weight for free electron charges and a second weight for free hole charges, wherein the first weight is larger than the second weight by at least a factor of 5.

12. The method of claim 11 wherein calculating the loss comprises calculating with the loss function comprising:

$$\text{Loss}_{RM3}=l[(qe_{gt}-qe_L)^2]+n[(qh_{gt}-qh_L)^2]$$

where $\text{Loss}_{RM3}$ is the loss, l is the first weight, $qe_{gt}$ is the free electron charge as a ground truth, $qe_L$ is the free electron charge as estimated by the neural network, n is the second weight, $qh_{gt}$ is the free hole charge as the ground truth, and $qh_L$ is the free hole charge as estimated by the neural network.

13. The method of claim 1 wherein the one or more physics-based phenomena includes trapping of the holes, transport of the holes, recombination of the holes, trapping of the electrons, transport of the electrons, and recombination of the electrons.

14. A method of training a neural network to estimate physical characteristics of semiconductor material, the method comprising:
 machine training, by a processor, the neural network, wherein the neural network models the semiconductor material in voxels with electrodes on the semiconductor material, where each voxel is represented in the neural network by a tensor field defined by (i) a location of the voxel within the semiconductor material and (ii) one or more physics-based phenomena;
 calculating, by the processor, a loss as part of the machine training, the loss being a difference from just electrode signals or just free charges; and
 storing the neural network as machine trained in a memory
 wherein machine training comprises training with training data, the training data including an injected charge into the semiconductor material and ground truth as the signals measured at the electrodes or the free charges measured at the voxels.

* * * * *